US011340371B2

(12) United States Patent
Willis et al.

(10) Patent No.: US 11,340,371 B2
(45) Date of Patent: May 24, 2022

(54) FIBER OPTIC NOISE MITIGATION FOR DISTRIBUTED ACOUSTIC SENSING

(71) Applicant: Halliburton Energy Services, Inc., Houston, TX (US)

(72) Inventors: Mark Elliott Willis, Katy, TX (US); Pedro William Palacios, Katy, TX (US); Andreas Ellmauthaler, Houston, TX (US); Xiaomin Zhao, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/872,652

(22) Filed: May 12, 2020

(65) Prior Publication Data

US 2021/0011185 A1 Jan. 14, 2021

Related U.S. Application Data

(60) Provisional application No. 62/872,788, filed on Jul. 11, 2019.

(51) Int. Cl.
*G01V 1/36* (2006.01)
*G01V 1/22* (2006.01)
*G01H 9/00* (2006.01)

(52) U.S. Cl.
CPC .............. *G01V 1/366* (2013.01); *G01H 9/004* (2013.01); *G01V 1/226* (2013.01); *G01V 2210/1429* (2013.01)

(58) Field of Classification Search
CPC ................... G01V 1/366; G01V 1/226; G01V 2210/1429; G01H 9/004
See application file for complete search history.

(56) References Cited

U.S. PATENT DOCUMENTS 4,796,237 A 1/1989 Hutchens et al.
2011/0188346 A1 8/2011 Hull
(Continued)

FOREIGN PATENT DOCUMENTS

CN 105158801 A 12/2015
CN 106842324 A 6/2017

OTHER PUBLICATIONS

Miller et al., DAS and DTS at Brady Hot Springs: Observations about Coupling and Coupled Interpretations, Feb. 12-14, 2018, Proceedings, 43rd Workshop on Geothermal Reservoir Engineering, Stanford University, Stanford, California, 13 pp. (Year: 2018).*

(Continued)

*Primary Examiner* — Toan M Le
(74) *Attorney, Agent, or Firm* — Delizio, Peacock, Lewin & Guerra

(57) ABSTRACT

To mitigate zigzag noise and increase the quality of data provided from DAS VSP in wells with significant vertical sections, zigzag noise characteristics are identified and quantified. The zigzag noise properties can be extracted from an analysis of an autocorrelation of DAS VSP traces. The zigzag noise has a characteristic time period or repeat time delay that is the time period for the noise to propagate along the wireline through a zone of the wellbore with poor acoustic coupling between the fiber optic cable and formation. This period can be identified from analysis of the autocorrelation referred to herein as a crosswise lag summation function. The crosswise lag summation function identifies groups of DAS data traces containing zigzag noise and outputs zigzag noise periodicity for each group of traces. Once it has been identified, the zigzag noise can be removed from the VSP data and improve formation evaluation.

20 Claims, 14 Drawing Sheets

(56) References Cited

U.S. PATENT DOCUMENTS

2017/0212263 A1 7/2017 Zhang et al.
2017/0235006 A1 8/2017 Ellmauthaler et al.
2020/0102821 A1 4/2020 Willis et al.
2020/0103544 A1 4/2020 Padhi et al.

OTHER PUBLICATIONS

One Petro Search Results, Jun. 7, 2021, 10 pp. (Year: 2021).*
Google Search Results, Jun. 8, 2021, 1 pp. (Year: 2021).*
Chen, et al., "Distributed Acoustic Sensing Coupling Noise Removal Based on Sparse Optimization", Society of Exploration Geophysicists & American Association of Petroleum Geologists, Nov. 15, 2018, 58 pages.
Chen, et al., "DAS Coupling Noise Suppression Using Wavelet and DCT Dictionary Based on Sparse Optimization", Society of Exploration Geophysicists, International Exposition & 86th Annual Meeting, 2018, pp. 4938-4942.
Constantinou, et al., "Improving DAS Acquisition by Real Time Monitoring of Wireline Cable Coupling", Society of Exploration Geophysicists, International Exposition and 86th Annual Meeting, 2016, pp. 5603-5607.
Huang, et al., "Applied Research of 3D DAS-VSP in Eastern China", Society of Exploration Geophysicists, Carbonate Reservoir E&P Workshop, Oct. 22-24, 2017, pp. 82-85.
Martuganova, et al., "DAS-VSP Measurements Using Wireline Logging Cable at the Gross Schoenebeck Geothermal Research Site", European Association of Geoscientists and Engineers, 81st Conference & Exhibition, Jun. 3-6, 2019, 5 pages.
Peacock, et al., "Predictive Deconvolution: Theory and Practice", Geophysics, vol. 34, No. 2, Apr. 1969, pp. 155-169.
Schilke, et al., "DAS and its Coupling for VSP Applications Using Wireline Cable", European Association of Geoscientists and Engineers/German Geophysical Society Workshop on Fibre Optic Technology in Geophysics, Mar. 31, 2017, 5 pages.
Schilke, et al., "Numerical Evaluation of Sensor Coupling of Distributed Acoustic Sensing Systems in Vertical Seismic Profiling", Society of Exploration Geophysicists International Exposition 86th Annual Meeting 2016, pp. 677-681.
Willis, et al., "Understanding Cable Coupling Artifacts in Wireline-Deployed DAS VSP Data", SEG19, San Antonio, TX, 18 pages.
Willis, et al., "Understanding Cable Coupling Artifacts in Wireline-Deployed DAS VSP Data", SEG International Exposition and 89th Annual Meeting, 2019, 5 pages.
Yu, et al., "Walkaway VSP Using Multimode Optical Fibers in a Hybrid Wireline", Society of Exploration Geophysicists, The Leading Edge: Special Section: Advances in Seismic Sensors, Jul. 2016, pp. 615-619.
PCT Application Serial No. PCT/US2020/032562, International Search Report, dated Aug. 20, 2020, 3 pages.
PCT Application Serial No. PCT/US2020/032562, International Written Opinion, dated Aug. 20, 2020, 6 pages.
Munn, et al., "Novel Cable Coupling Technique for Improved Shallow Distributed Acoustic Sensor VSPs", Journal of Applied Geophysics, vol. 1, 2017, 8 pages.

* cited by examiner

Predictive Deconvolution

Predictive Deconvolution with Adaptive Subtraction

Time Reversed Deconvolution

Time Reversed Deconvolution with Adaptive Amplitude Subtraction

Time Reversed Deconvolution with Adaptive Amplitude and Time Shift Subtraction

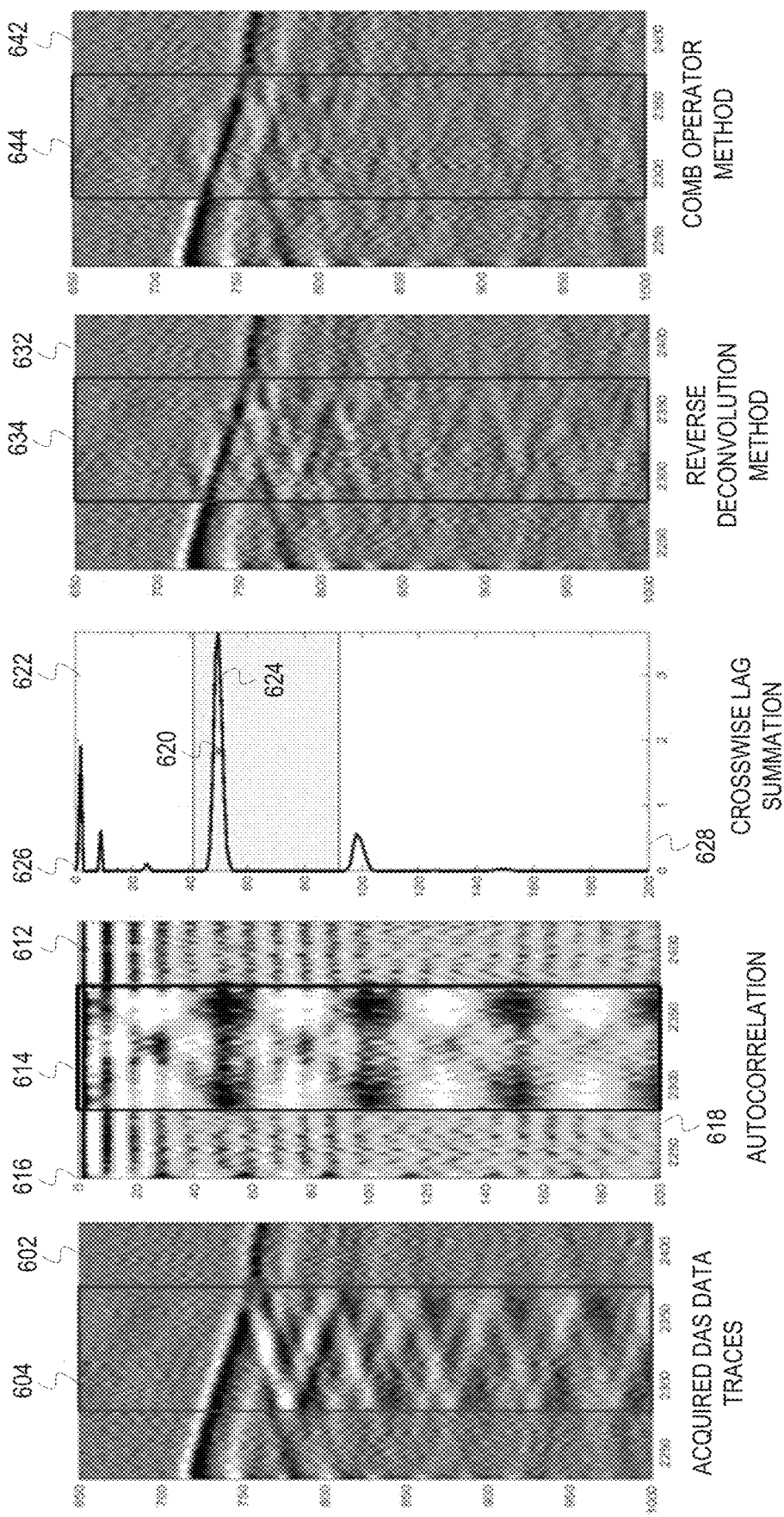

FIBER OPTIC NOISE MITIGATION FOR DISTRIBUTED ACOUSTIC SENSING

TECHNICAL FIELD

The disclosure generally relates to the field of fiber optics and more particularly to fiber optic noise mitigation for distributed acoustic sensing.

BACKGROUND

When acquiring vertical seismic profile (VSP) data with fiber optic distributed acoustic sensing (DAS), the fiber optic cable is often not in adequate acoustic contact with the borehole wall. This inadequate contact allows for contamination of a desired seismic signal with reverberatory noise signals. These noise signals can originate with acoustic waves that propagate back and forth, up and down free hanging portions of the cable between locations along the well where the cable is in adequate contact with the well bore or is otherwise secured. Where the cable is in good contact with the well bore, the desired seismic signals, typically from a seismic source located at the earth's surface and transmitted through the formation, are picked up by the fiber optic glass in the cable and good or noise-free seismic data is acquired by the DAS VSP acquisition system. However, in zones where the cable is not in good acoustic contact with the well bore, the seismic signal, which comes through the borehole wall from the formation, can be dominated by this ringing or reverberatory noise. This reverberating noise that propagates back and forth and up and down the cable in the acoustically uncoupled zones is defined as a zigzag noise.

BRIEF DESCRIPTION OF THE DRAWINGS

Embodiments of the disclosure may be better understood by referencing the accompanying drawings.

FIG. 6A shows a range of DAS VSP field data traces.

FIG. 6B shows the autocorrelation of each trace of FIG. 6A.

FIG. 6C shows the crosswise lag summation function operating on the autocorrelation data of FIG. 6B.

FIG. 6D shows the results of applying the reverse deconvolution method to the data of FIG. 6A.

FIG. 6E shows the result of applying the time-limited operator to the data of FIG. 6A.

DESCRIPTION

Figure 1:
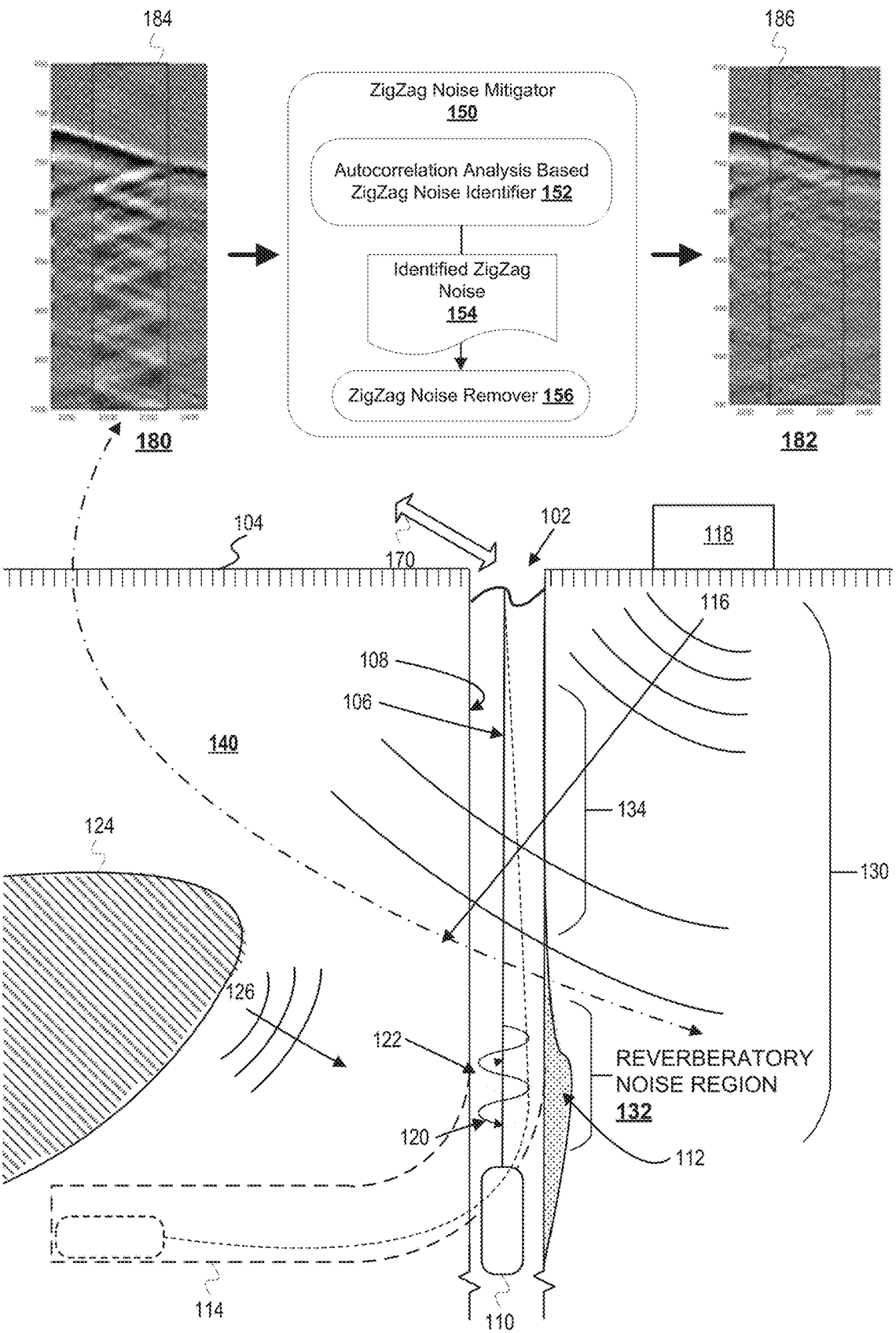
FIG. 1 illustrates an example wireline DAS system where reverberatory or zigzag noise is detected and subsequently removed from data.

The description that follows includes example systems, methods, techniques, and program flows that embody aspects of the disclosure. However, it is understood that this disclosure may be practiced without these specific details. For instance, this disclosure refers to reverberatory or zigzag noise acquired by wireline DAS. Aspects of this disclosure can also be applied to noise mitigation in other acoustic fiber optic applications. In other instances, well-known instruction instances, protocols, structures and techniques have not been shown in detail in order not to obfuscate the description.

Overview

In many instances DAS VSP will acquire acoustic sensing data via wireline cables which contain embedded fiber optic cables. Most of the wells being surveyed will have significant portions, if not the entire well, where the wellbore will be essentially vertical. In vertical portions of wells where a service provider may attempt to acquire DAS VSP data, the acoustic coupling between the wireline cable and the borehole wall may be poor. Thus, a significant amount of data may be contaminated by zigzag noise.

To mitigate this noise and increase the quality of data provided from DAS VSP in wells with significant vertical sections, zigzag noise characteristics are identified and quantified. The zigzag noise properties can be extracted from an analysis of an autocorrelation of DAS VSP traces. The zigzag noise has a characteristic time period or repeat time delay—i.e. a characteristic frequency—that is the time period for the noise to propagate along the wireline through a zone of the wellbore with poor acoustic coupling between the fiber optic cable and formation. This period can be identified from analysis of the autocorrelation referred to herein as a crosswise lag summation function. The crosswise lag summation function identifies groups of DAS data traces containing zigzag noise and outputs zigzag noise periodicity for each group of traces. Once it has been identified, the zigzag noise can be removed from the VSP data and improve formation evaluation.

Removal of the zigzag noise can be done with either of two different techniques. The first cycle of zigzag noise, which overlaps with the arrival of the seismic event, obscures the seismic event arrival time in regions of reverberatory noise. Because the first arrival time of the seismic event provides important information about the formation, deconvolving the two signals preserves information important to formation quantification. The first removal technique is a predictive or gap deconvolution applied on the time-reversed traces containing zigzag noise. Then an adaptive subtraction is applied to remove any artificial signal created before the seismic event by the time-reversed deconvolution. Amplitude and phase matching of the adaptive subtraction technology can be used to match both the amplitude and phase of the actual trace noise before subtracting predicted noise from measured data. The second technique extracts zigzag noise wavelets by a combination of applying a time-limited comb operator and a median filter.

Example Illustrations

FIG. 1 illustrates an example wireline DAS system where reverberatory or zigzag noise is detected and subsequently removed from data. The wireline DAS system includes a retrievable wireline tool 110 disposed in a wellbore 108 of a geological formation 140 via a wireline 106. The wireline 106 includes an optical fiber configured to detect acoustic waves 116 or other seismic signals traveling through the formation 140 from a seismic source 118 at the surface 104. The optical fiber may be embedded in the wireline 106 or included in a fiber optic cable or optical fiber bundle disposed in the wellbore 108 along with the wireline 106. The wellbore 108 includes a significantly vertical portion 130 and can include a horizontal or non-vertical section 114. The formation 140 can include a subsurface reservoir 124 which produces reflective acoustic waves 126 in response to the acoustic waves 116 generated at the surface 104. The optical fiber of the wireline 106 passes through a region of good acoustic contact with the wellbore 134 and a reverberatory noise region 132.

In the reverberatory noise region 132 the optical fiber of the wireline 106 experiences downward vibrations 120 and upward vibrations 122 in response to incident acoustic waves, which manifest as ringing or zigzag noise in the data. The downward vibrations 120 can travel faster than the acoustic waves in the surrounding formation which causes discontinuity in first arrival times for seismic or acoustic events for the reverberatory portion of the optical fiber. Downward and upward vibrations can travel at different speeds, i.e. have different periodicity or frequency. The downward vibrations 120 and upward vibrations 122 may propagate reflectively downward and upward over a reverberatory noise region 132 many times before dissipating. The reverberatory noise region 132 may be caused by a defect or irregularity 112 in the wellbore 108 such that the optical fiber of the wireline 106 does not adequately contact the wellbore wall for acoustic wave transfer or is otherwise free hanging. The reverberatory noise region 132 corresponds to a general physical region in the wellbore 108, but may migrate or appear and disappear as the wireline 106 is raised, lowered, or otherwise adjusted. Zigzag noise appears consistently at depth regardless of which portions of the wireline or optical fiber is disposed in the region of reverberatory noise 132 and is therefore not a function of wireline or optical fiber defects. Inconsistency in the bounds of the region of reverberatory noise arises from the irregularity of defects in the wellbore—i.e. a free hanging wireline may not contact the exact same portions of wellbore wall each time it is disposed or moved within a wellbore. In the example illustration, upward vibrations 122 are shown as reflections of downward vibrations 120 off of a reflection point, which can be a transition from a region of free hanging wireline to a region of wireline in good acoustic contact with the wellbore or a cable clamp or other connection point. The reverberatory noise region 132 produces a zigzag noise effect in DAS data plot 180.

The optical fiber of the wireline 106 may be communicatively coupled to the computer or processor via a wired or wireless connection 170. The wired connection may be a cable which facilitates communication while the wireless communication may be one or more of an electromagnetic, optical, or acoustic connection. The acoustic signal from the optical fiber of the wireline 106 may be processed by a digitizer and other DAS signal acquisition apparatus at the surface 104 or in the wellbore 108 and then transmitted to another computing device at the surface. The computing device at the surface may include the digitizer and DAS signal acquisition apparatus or be itself a component of the DAS signal acquisition apparatus. The computing device includes a zigzag noise mitigator 150.

The zigzag noise mitigator 150 represents program code to identify regions of zigzag noise, calculate the periodicity of zigzag noise in those regions, and subtract zigzag noise from DAS data traces in order to reconstitute noise-mitigated DAS data including first arrival times for seismic events. The zigzag noise mitigator 150 can be embodied in a controller or installed on a computing device in communication with a controller to control DAS signal acquisition. The zigzag noise mitigator 150 may be embodied within the DAS signal acquisition apparatus. The zigzag noise mitigator 150 can logically be divided into an autocorrelation analysis based zigzag noise identifier 152 and a zigzag noise remover 156, although organization of program code can vary by platform, developer preference, etc. The zigzag noise identifier 152 identifies regions of zigzag noise from DAS data or sets of DAS traces obtained at depths in the wellbore 108. The zigzag noise identifier 152 first determines an autocorrelation value for the DAS data as a function of time lags, where the autocorrelation function is a convolution of the DAS data trace f for a specific channel identifier j (which is approximately proportional to depth in the well), and the complex conjugate of the same DAS data trace offset by a time lag (where time lag $\ell$ is the name for the time offset between the two versions of the data traces) and where $n_{max}$ is the number of samples in the data (i.e. number of time samples considered) as shown in Equation 1.

$$R_j(\ell) = \sum_{n=1}^{n=n_{max}} f(n)\overline{f(n-\ell)} \qquad \text{Eq. 1}$$

Since the DAS data trace, i.e. the acoustic signal f(n), is real the complex conjugate of f(n−$\ell$) is itself and this simplifies as shown in Equation 2.

$$R_j(\ell) = \sum_{n=1}^{n=n_{max}} f(n)f(n-\ell) \qquad \text{Eq. 2}$$

Autocorrelation herein may refer to autocorrelation values, the autocorrelation function, or an algorithm producing the autocorrelation. The autocorrelation values identify groups of DAS traces characteristic of zigzag noise. Any trace from the well DAS data can be input into the autocorrelation function. Groups of traces that correspond to regions of zigzag noise will produce distinctive autocorrelation patterns and periodicity, as will be discussed in reference to FIG. 2C and FIG. 3B. The zigzag noise identifier 150 then operates a crosswise lag summation function upon the autocorrelation function in order to identify both groups of DAS data traces experiencing zigzag noise and the periodicity of such zigzag noise.

The crosswise lag summation function operates on the autocorrelation of the DAS data. For each lag, the crosswise lag summation function calculates a summation over all channel lengths of the autocorrelation as shown in Equation 3.

$$X(\ell) = \Sigma_{j=chan_{min}}^{chan_{max}} (R_j(\ell) + R_j(\lambda) + R_j(\rho))$$  Eq. 3

Where $\lambda$ corresponds to the left to right diagonal from $\ell=0$ and $j=chan_{min}$ to $\ell$ and $j=chan_{max}$ and $\rho$ correspond to right to left diagonal from $\ell=0$ and $j=chan_{max}$ to $\ell$ and $j=chan_{min}$ and $\lambda$ and $\rho$ are subject to the relationships shown in Equations 4 and 5, respectively.

$$\lambda = \text{round}\left(\frac{\ell*(j - chan_{min})}{chan_{max} - chan_{min}}\right)$$  Eq. 4

$$\rho = \text{round}\left(\frac{\ell*(chan_{max} - j)}{chan_{max} - chan_{min}}\right)$$  Eq. 5

The crosswise lag summation sums over all autocorrelation values for lag $\ell$ and over both the left and right diagonals including all values of lag between 0 and $\ell$ for the region of zigzag noise (i.e. over all channel numbers j included in the group of traces), as will be shown in FIG. 3. The lag $\ell$ for which the crosswise lag summation function produces a universal maximum value is the periodicity of the zigzag noise. The groups of DAS data traces (from adjacent channel identifiers) identified as experiencing zigzag noise together with periodicity of such zigzag noise for the group of traces is output by the zigzag noise identifier 152 as identified zigzag noise 154. The identified zigzag noise 154 is then subtracted from the acquired DAS data plot 180 by the zigzag noise remover 156 to produce a noise mitigated DAS data plot 182.

Figure 2C:
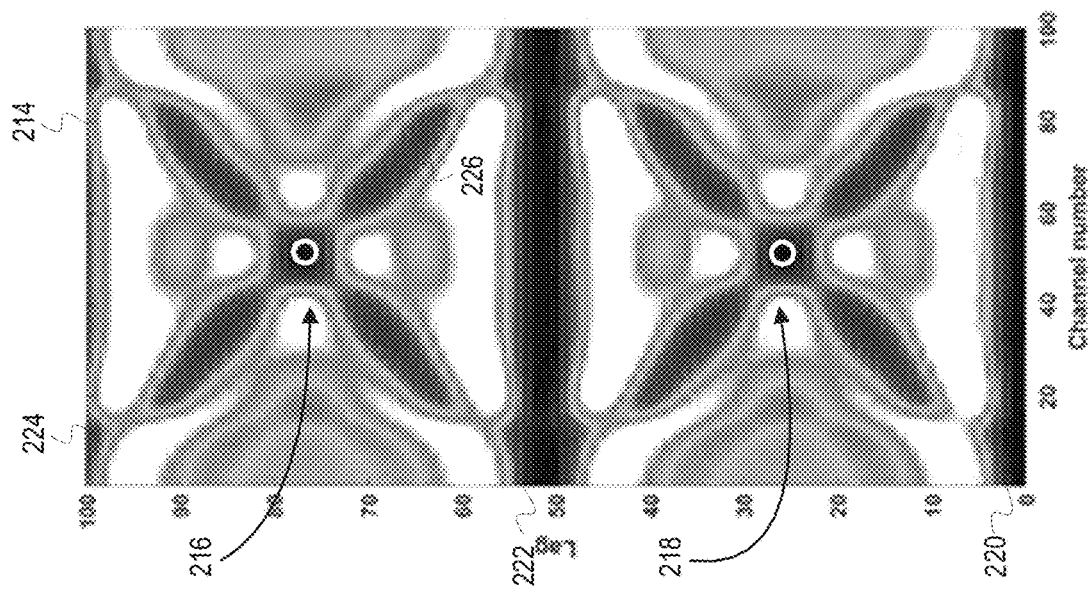
FIG. 2C is a graph of the autocorrelation function acting on the DAS data of FIG. 2A including lags from 0 to 100 ms.
Figure 2B:
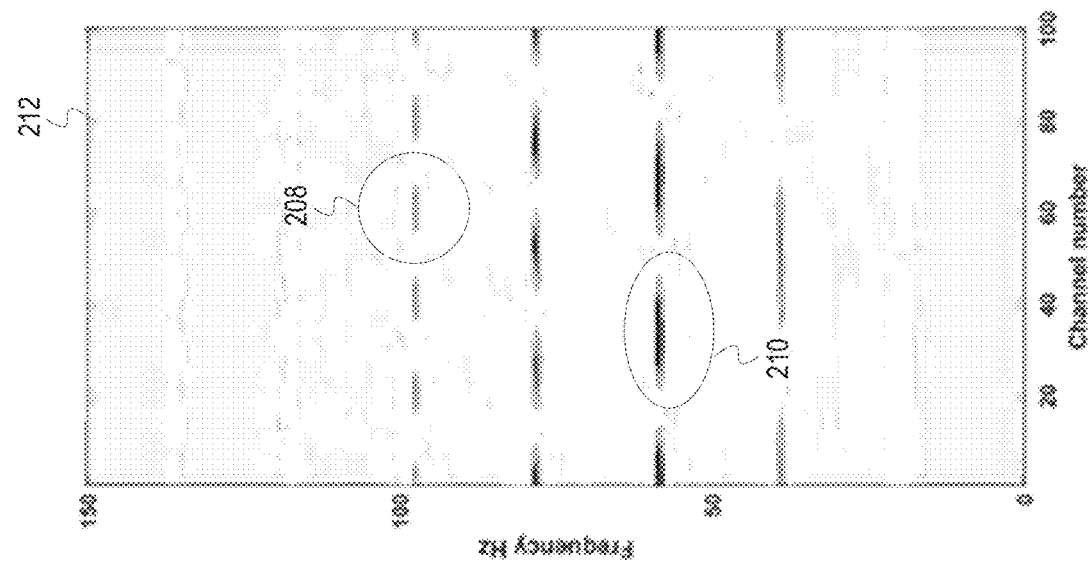
FIG. 2B is a graph of the amplitude spectra in the time frequency domain for the DAS data from FIG. 2A.
Figure 2A:
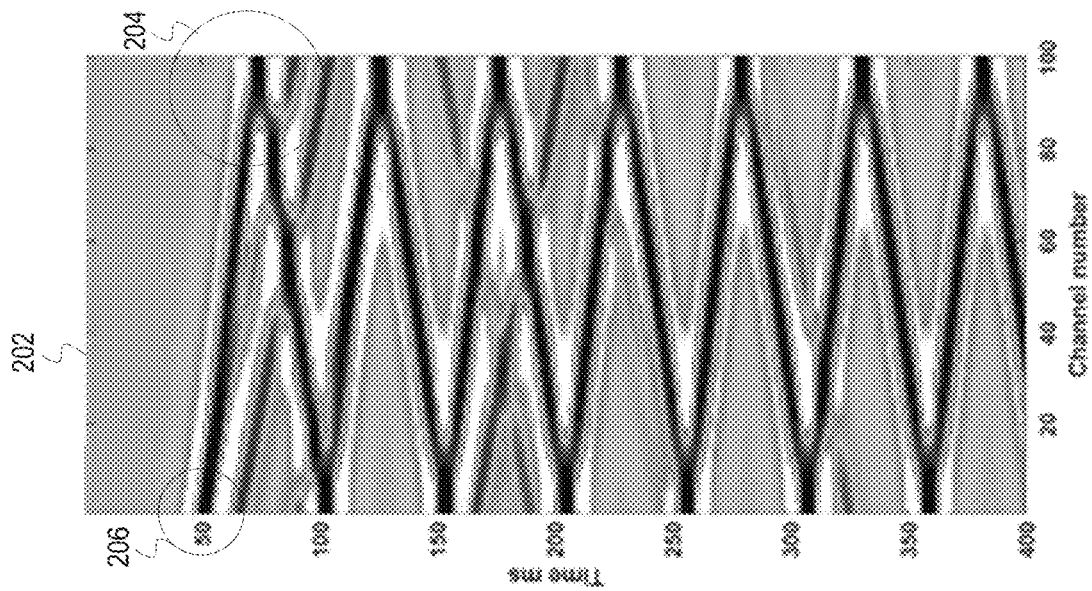
FIG. 2A is a depiction of simulated zigzag noise obscuring VSP seismic data.

Acoustic data information may be displayed or organized as shown in the DAS data plot 180. Data plot 180 shows acoustic signal intensity in grayscale as a function of depth in the well (where channel length on the x-axis is directly related to depth) and time (on the y-scale). A box 184 encloses a group of DAS data traces corresponding to a reverberatory or zigzag noise region. Data plot 182 includes a box 186 that encloses the same group of traces with the zigzag noise removed. After the zigzag noise mitigator 150 operates on the data traces represented by data plot 180, noise mitigated data plot 182 is produced. Noise mitigated DAS data plot 182 shows the region formerly obscured by zigzag noise now free of zigzag noise and shows the recovered first arrival time data from the seismic event. FIGS. 2A-2C provide larger graphs for better illustration of arrival time data, zigzag noise, and the autocorrelation function. Noise mitigated DAS data plot 182 can now be used to more accurately determine information about reservoir 124 and formation 140.

FIG. 2A is a depiction of simulated zigzag noise obscuring VSP seismic data. Graph 202 depicts simulated DAS VSP data plus simulated zigzag noise generated with a pattern repeat of 50 milliseconds (ms). The x-axis corresponds to channel number which increases with depth in the well and the y-axis corresponds to time in ms. Acoustic signal strength recorded at each channel is displayed in grayscale. The darkest lines represent positive acoustic signal while white portions of the graph represent negative acoustic signal. Gray or medium black portions of the graph represent no acoustic intensity or regions with only baseline acoustic signals. The addition of the simulated zigzag noise obscures the first arrival time for the seismic event, especially for larger channel numbers where channel numbers increase as a function of depth. At channel number 100, the first arrival event 204 corresponds to zigzag noise, not to the seismic event, while at channel number 0 the zigzag noise and seismic event 206 are contemporaneous. The first arrival time is used to determine information about the formation and associated strata and reservoirs, so the first arrival time for the seismic event is deconvolved from the first arrival event corresponding to zigzag noise.

FIG. 2B is a graph of the amplitude spectra in the time frequency domain for the DAS data from FIG. 2A. The amplitude spectra are the frequency domain Fourier transform of the acoustic signal for each channel. The amplitude spectra show that zigzag noise cannot be a product of a high frequency wave propagating in the wireline, because no high frequency signal appears in the frequency domain. The frequency domain spectrums for each trace show extremely high amplitude peaks (depicted in dark ink) such as those peaks 208 and 210 as identified by reference characters. The spectra background is suppressed (as shown corresponding to white field areas of graph 212) in relation to the peak heights. The multiple peaks present in the frequency domain appear in specific frequency bands, such as at approximately 39 Hz, 57 Hz, 78 Hz, 96 Hz, etc. for various channel numbers. Breaks between peaks occurring at the same frequency but not appearing for all channel numbers are due to destructive interference effects between upward and downward traveling reverberatory waves of zigzag noise. The discontinuity of peaks in the frequency domain prohibits efficient subtraction of zigzag noise in the frequency domain, therefore noise mitigation in the time domain is preferred.

FIG. 2C is a graph of the autocorrelation function acting on the DAS data of FIG. 2A including lags from 0 to 100 ms. Graph 214 shows the magnitude of the autocorrelation (Eq. 2) function as applied to each trace (where a trace is the DAS data for single channel over a recorded time period) of DAS data. The white areas in the field of graph 214 correspond to negative values of the autocorrelation function $R_j(\ell)$ while black areas correspond to large positive values. Regions of maximum positive value 216 and 218 in the autocorrelation are encircled by white lines (which are not a feature of the autocorrelation) in order to identify these peaks. The graph presented here is displayed in black and white, but in a full color graph (as could be displayed on a computer screen) these regions of maximum intensity would be differentiable from surrounding regions by plotting in a contrasting color.

The autocorrelation graph 214 displays a distinctive crossing pattern that indicates the presence of zigzag noise. The autocorrelation function experiences local maximums 220, 222, and 224 across all channel numbers for lags of 0 ms, 50 ms, and 100 ms (which is depicted on the edge of the graph). 50 ms is the periodicity of the simulated zigzag noise portion of the data displayed in FIG. 2A, and gives rise to these autocorrelation maximums 220, 222, and 224. Additional diagonal regions of high intensity—such as the diagonal region of high intensity 226—extend from the local maximums 220, 222, and 224 and cross at the maximum positive values 216 and 218. These diagonal regions correspond to the constructive interference between upward and downward traveling reverberations in the autocorrelation. Together this pattern of peaks in the autocorrelation data identifies groups of channel numbers experiencing zigzag noise, as separate from regions not experiencing zigzag noise which do not produce this autocorrelation pattern as will be shown in FIG. 3B.

Figure 3C:
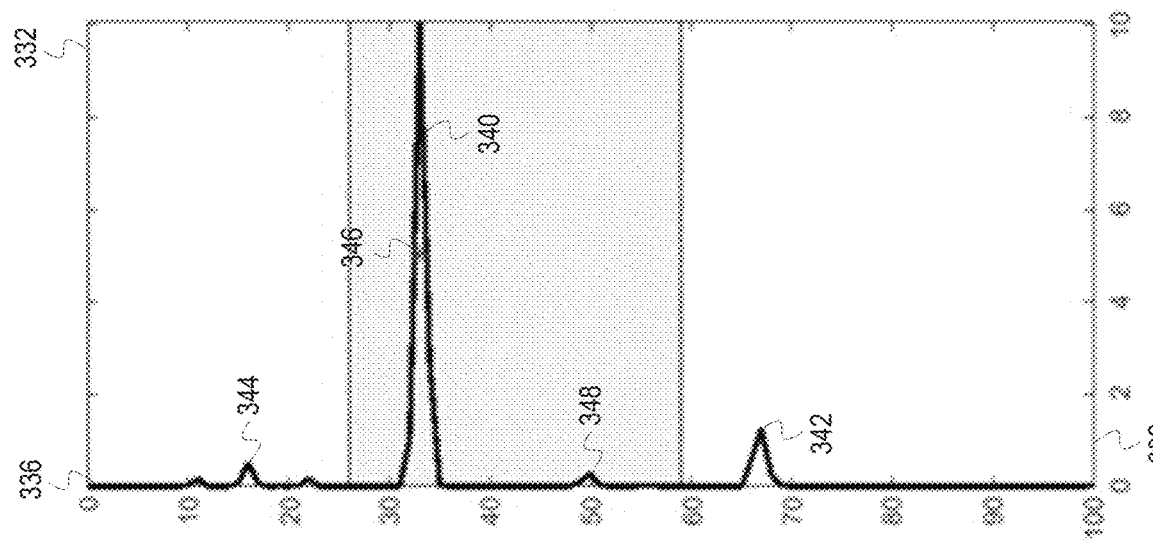
FIG. 3C is a graph of the value of the crosswise lag summation function operating on the autocorrelation data of FIG. 3B to identify the periodicity of zigzag noise.
Figure 3B:
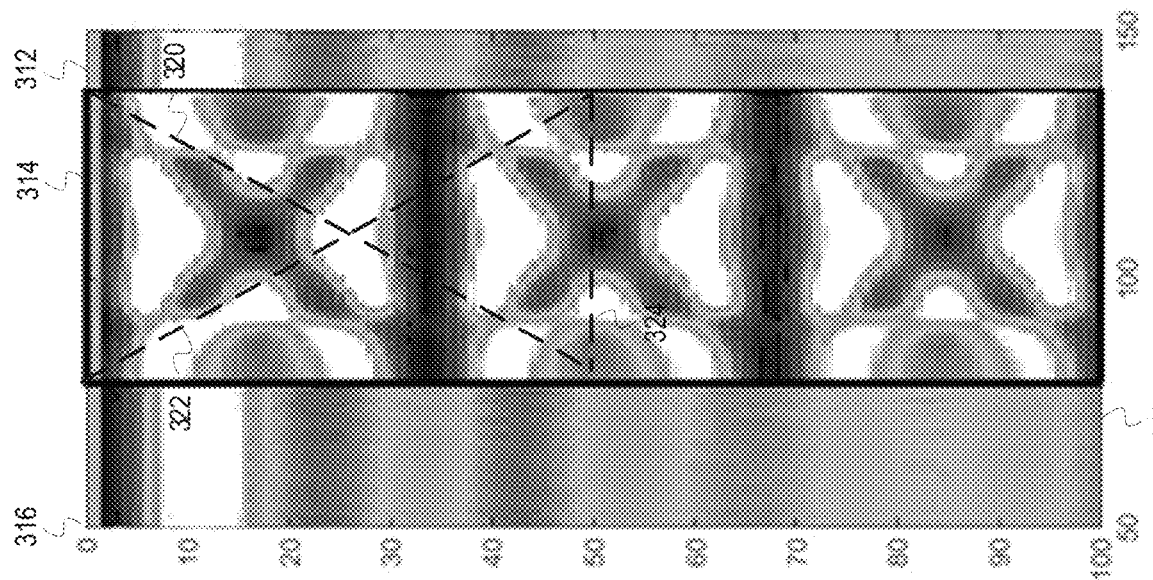
FIG. 3B is a graph of the autocorrelation function acting on the DAS data of FIG. 3A.
Figure 3A:
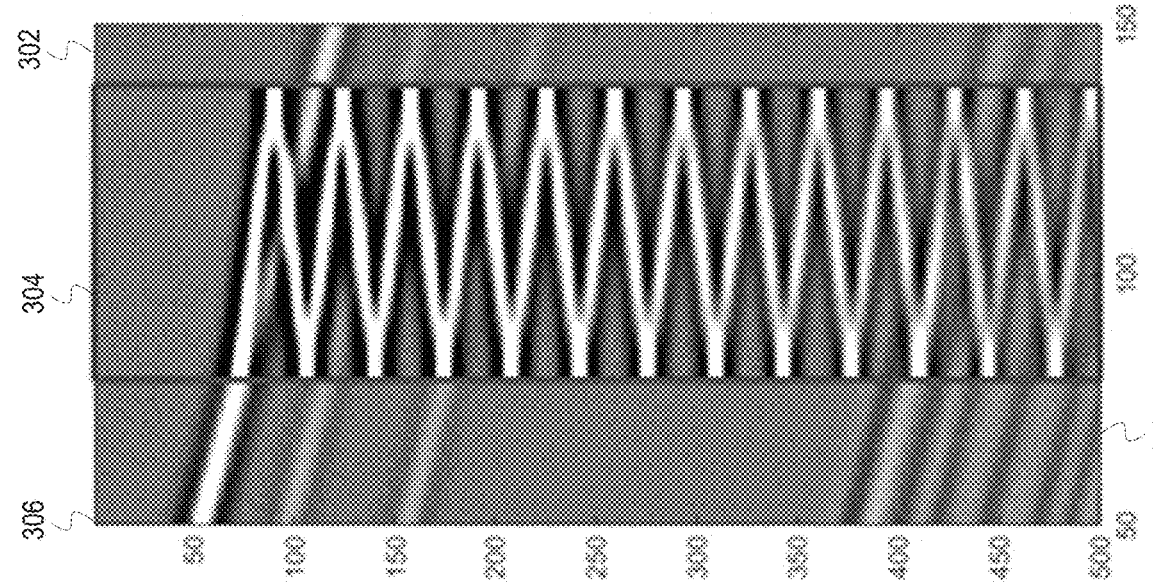
FIG. 3A is a depiction of DAS results showing a second set of simulated zigzag noise and VSP seismic data.

FIG. 3A is a depiction of DAS results showing a second set of simulated zigzag noise and VSP seismic data. Graph 302 depicts simulated DAS VSP data plus simulated zigzag noise generated with a pattern repeat of 33 ms. Graph 302 shows DAS data traces that correspond to both regions of the wellbore with zigzag noise (included in a box 304), and regions of the wellbore without reverberatory noise. Acoustic intensity is plotted in grayscale as a function of channel identifier (on x-axis 308) and time in ms (on y-axis 306). For graph 302, large positive acoustic signals are shown in white, while large negative acoustic signals are shown in black, and baseline acoustic signals are depicted in gray.

FIG. 3B is a graph of the autocorrelation function acting on the DAS data of FIG. 3A. Graph 312 shows the autocorrelation function magnitude as a function of channel length (plotted on x-axis 318) and time lag $\ell$ (plotted on y-axis 316), in grayscale where large positive magnitudes are black, large negative magnitudes are white, and magnitudes near zero are shown in gray. The autocorrelations for the group of DAS data traces that correspond to zigzag noise (from box 304 of FIG. 3A) are shown in box 314. The autocorrelation function for traces which exhibit zigzag noise exhibits the characteristic periodicity and crossing pattern that indicates the presence of zigzag noise. Autocorrelations for DAS traces without zigzag noise, i.e. with only seismic signal response and not included in box 304 of FIG. 2A, display a single maximum intensity peak for time lag $\ell \approx 0$ and no additional peaks. The zigzag noise identifier 152 locates and identifies groups of DAS traces corresponding to zigzag noise by searching for groups where the autocorrelation of adjacent traces (i.e. with subsequent channel identifiers) exhibits periodicity.

From identified regions of periodic zigzag noise, the periodicity of such noise can be calculated by the crosswise summation function. The autocorrelations which contribute to the crosswise lag summation function for a lag $\ell=50$ ms are shown. Dashed line 322 depicts the autocorrelations which make up $R_j(\lambda)$, dashed line 320 depicts $R_j(\rho)$, and dashed line 324 depicts $R_j(\ell)$ for $\ell=50$ ms. The crosswise summation function, because it included the diagonal summation portions, reaches a maximum at the smallest unit of periodicity. As is shown in box 314, the autocorrelation exhibits periodicity with maximum peaks at approximate lags $\ell=33$ ms, 66 ms, 99 ms, and for additional multiples of the smallest unit of periodicity 33 ms. In order to select the smallest unit of periodicity (i.e. 33 ms and not 66 ms) as the zigzag noise periodicity, diagonal summation over the diagonal peaks of the autocorrelation is included. The crosswise diagonal summation arms $R_j(\lambda)$ and $R_j(\rho)$ have a maximum value for the lag $\ell$ where they cross at the center constructive interference peak of the autocorrelation repeat (i.e. at the point $\ell=\frac{1}{2}\tau_{min}$ where $\tau_{min}$ is the minimum period and at $$j = \frac{chan_{max} - chan_{min}}{2}$$

which is the center channel for the group of traces experiencing zigzag noise). The value of the crosswise lag summation function is plotted in FIG. 3C.

FIG. 3C is a graph of the value of the crosswise lag summation function operating on the autocorrelation data of FIG. 3B to identify the periodicity of zigzag noise. Graph 332 shows the magnitude of the crosswise summation lag function (plotted on the x-axis 338) as a function of time lag $\ell$ (plotted in ms on y-axis 336). The universal maximum of the crosswise summation lag function occurs for peak 340 at $\ell=33$ ms. The zigzag noise identifier 152 locates an approximate center 346 of peak 340 to produce a best estimate for the periodicity of the zigzag noise, $\ell=33$ ms for graph 332. Satellite peak 342 corresponds to a local maximum at twice the minimum periodicity, i.e. for $\ell=66$ ms, and satellite peak 344 corresponds to a local maximum at half the minimum periodicity, i.e. for $\ell=16.5$ ms. These satellite peaks occur at time lags $\ell$ where the $R_j(\ell)$ component of the crosswise lag summation function includes summation over a peak in the autocorrelation function (represented by dashed line 324 of FIG. 3B). The inclusion of a local central maximum at $\ell \approx 50$ ms and $$j = \frac{chan_{max} - chan_{min}}{2}$$

in the $R_j(\ell)$ component represented by dashed line 324 of FIG. 3B produces satellite peak 348 in the crosswise lag summation function of FIG. 3C. Diagonal portions of the crosswise lag summation function experience universal maximums for the lag $\ell$ corresponding to the smallest unit of periodicity, so inclusion of the diagonal summations (as represented by dashed lines 320 and 322 of FIG. 3B) allows the zigzag noise identifier to differentiate between units of periodicity.

Figure 4A:
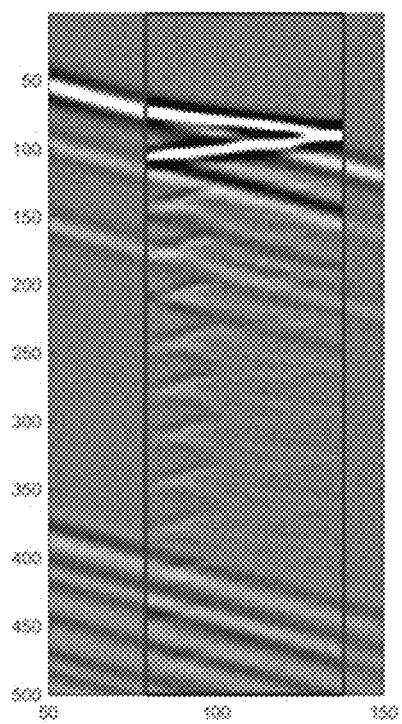
FIG. 4A is depiction of the application of a standard predictive deconvolution algorithm to the data of FIG. 3A in order to remove zigzag noise.

FIG. 4A is depiction of the application of a standard predictive deconvolution algorithm to the data of FIG. 3A in order to remove zigzag noise. Predictive deconvolution is a standard method of deconvolution used on seismic data in order to remove or attenuate multiple predictable waveforms from unpredictable signals (where the unpredictable signals represent data and the predictable signals correspond to noise). The application of predictive deconvolution on the DAS traces of FIG. 3A applied with a periodicity of 33 ms, as determined from the crosswise lag summation function of FIG. 3C, shows that predictive deconvolution removes zigzag noise after the cycle well, but fails to attenuate the first cycle of zigzag noise. Because the first cycle distorts the first arrival time in the group of traces corresponding to zigzag noise, other removal techniques can be used to address this distortion.

Figure 4B:
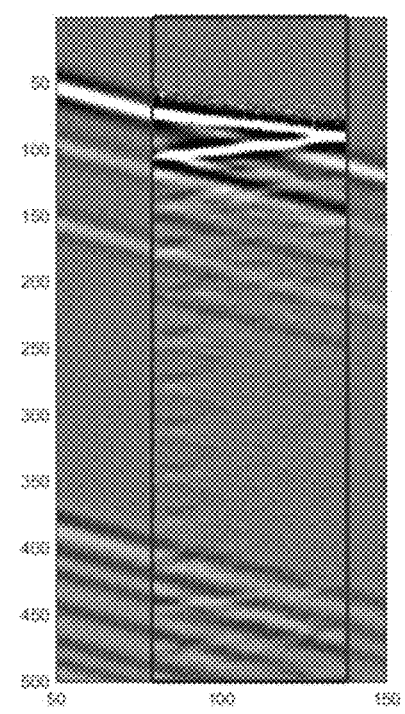
FIG. 4B is a depiction of the application of a standard predictive deconvolution algorithm with adaptive subtraction to the data of FIG. 3A in order to remove zigzag noise.

FIG. 4B is a depiction of the application of a standard predictive deconvolution algorithm with adaptive subtraction to the data of FIG. 3A in order to remove zigzag noise. Adaptive subtraction is a method of scaling a noise estimate or attenuation factor to properly match the scale and time shift of the noise to be subtracted. Applying adaptive subtraction with predictive deconvolution to the data traces of FIG. 3A removes more of the second cycle and latter zigzag noise than predictive deconvolution alone (as is seen when comparing FIG. 4A and FIG. 4B) but does not improve removal of the first cycle of zigzag noise.

Figure 4C:
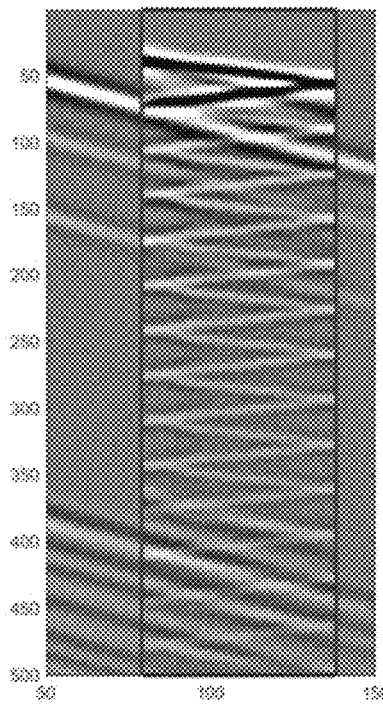
FIG. 4C is a depiction of the application of a time-reversed deconvolution algorithm to the data of FIG. 3A in order to remove zigzag noise.

FIG. 4C is a depiction of the application of a time-reversed deconvolution algorithm to the data of FIG. 3A in order to remove zigzag noise. If DAS data traces are reversed in time (i.e. where for FIG. 4C 500 ms is taken as the starting time and 0 ms is set to be the end time) and the predictive deconvolution is applied, a time-reversed predictive deconvolution is generated. In the time-reversed deconvolution, noise subtraction generates a negative pre-first cycle artifact for times before the arrival of the first cycle of the zigzag noise. In order to use time-reversed deconvolution, the zigzag noise remover 154 also removes the acausal early noise via another operation.

Figure 4D:
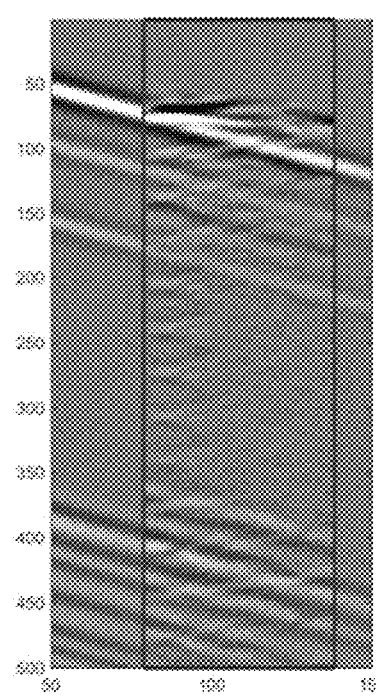
FIG. 4D is a depiction of the application of a time-reversed deconvolution algorithm with adaptive amplitude subtraction to the data of FIG. 3A to remove zigzag noise.

FIG. 4D is a depiction of the application of a time-reversed deconvolution algorithm with adaptive amplitude subtraction to the data of FIG. 3A to remove zigzag noise. Using an adaptive subtraction to match the noise signal generated by predictive deconvolution to the zigzag noise signal removes more of the zigzag noise than time-reversed deconvolution itself and also removes a large portion of the noise artifact induced before the arrival of the seismic event. The zigzag noise for time between 200 and 500 ms in FIG. 4D is reduced versus that shown in FIG. 4C. The acausal early noise is also mitigated, but not completely removed.

Figure 4E:
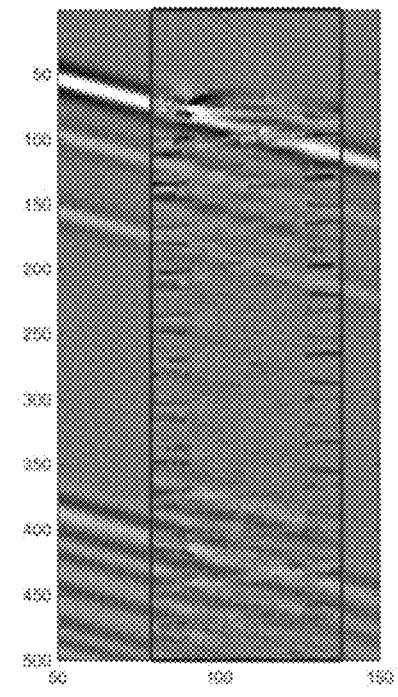
FIG. 4E is a depiction of the application of a time-reversed deconvolution algorithm with both adaptive amplitude subtraction and time shift subtraction to the data of FIG. 3A to remove zigzag noise.

FIG. 4E is a depiction of the application of a time-reversed deconvolution algorithm with both adaptive amplitude subtraction and time shift subtraction to the data of FIG. 3A to remove zigzag noise. Time shift subtraction involves using adaptive subtraction to match the generated noise signal to both the phase (or time shift) and amplitude of the measured noise in order to improve attenuation. As is seen in FIG. 4E, adaptive amplitude subtraction and time shift subtraction combined recover move of the seismic signal, including the first arrival data, than other methods shown in FIG. 4A-4D.

Figure 5A:
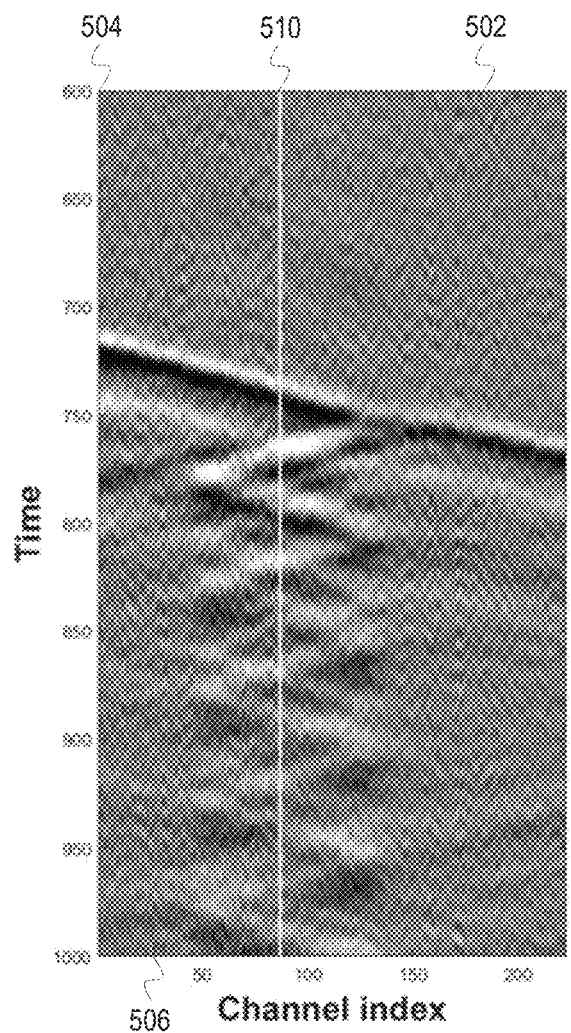
FIG. 5A shows a set of DAS VSP field traces which include zigzag noise between channels 50 and 130.

FIG. 5A shows a set of DAS VSP field traces which include zigzag noise between channels 50 and 130. Graph 502 includes DAS data showing both zigzag noise and a first arrival event for a seismic source as a function of channel index (plotted on x-axis 506) and time in ms (plotted on y-axis 504). A single trace 510 from the center of the group of traces (where j=87) that exhibit zigzag noise is selected and displayed on FIG. 5B.

In an embodiment, zigzag noise is subtracted from groups of DAS data traces using a time-limited comb operator. The time-limited comb operator operates at the zigzag periodicity to sum and enhance noise signals over data signals in order to correctly remove all signal corresponding to noise. The time-limited comb operator consists of n "tines" of one channel in width each with an amplitude of unity spaced at the zigzag periodicity. Two example time-limited comb operators are depicted in FIG. 5B.

Figure 5B:
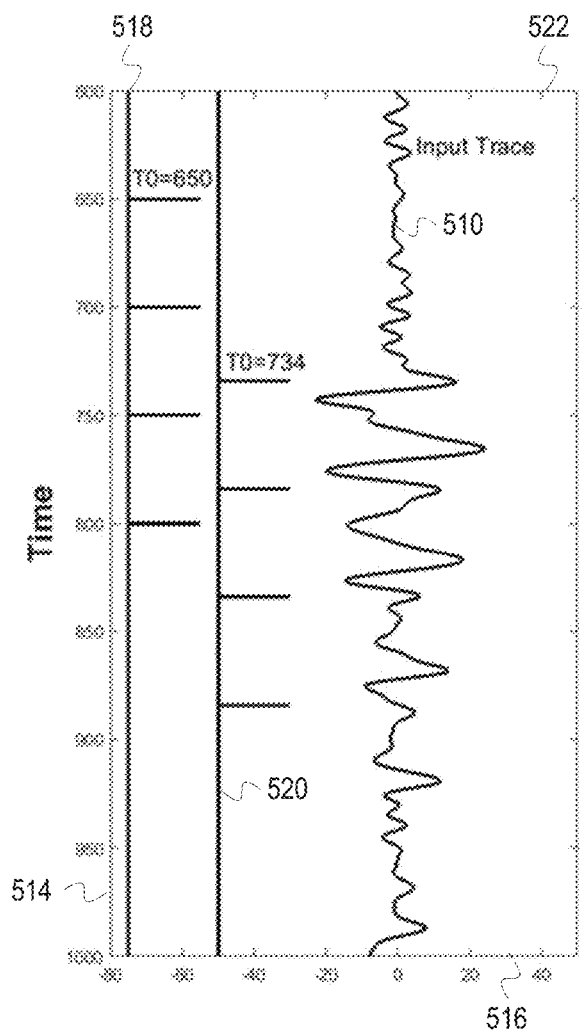
FIG. 5B shows a single trace selected from the data in FIG. 5A and a time-limited comb operator at position $T_0=650$ ms and $T_0=743$ ms.

FIG. 5B shows a single trace selected from the data in FIG. 5A and a time-limited comb operator at position $T_0=650$ ms and $T_0=743$ ms. DAS data trace 510 in FIG. 5B is the selected trace 510 highlighted in FIG. 5A. The data trace 510 is plotted on graph 522 as a function of acoustic signal amplitude (on x-axis 516) and time in ms (plotted on y-axis 514). Time-limited comb operator 518 consists of four (n=4) tines spaced 50 ms, which is the smallest period as determined by the zigzag noise identifier 152 operating the crosswise lag summation function. The time limited comb operator 518 is shown at $T_0=650$ ms and later position where $T_0=743$ ms (identified as a time-limited comb operator 520 on graph 522). $T_0$ for the comb operator is the earliest time at which a tine is located. The time-limited comb operator travels across the time range of the DAS data from $T_0=0$ to $T_0+\tau(n-1)=T_{max}$ where $T_{max}$ is the maximum selected time value selected and $\tau$ is the period of the identified zigzag noise. The time-limited comb operator travels forward in time selecting a set of values, four values for this example, separated by period $\tau$ (the smallest periodicity) and summing them. For positions of $T_0$ where the comb operator coincides with noise in trace 510, a summation over the comb operator values enhances reverberatory noise signal. By convolving the comb operator with each DAS data trace, zigzag noise signals can be gathered and enhanced so that they can be fully subtracted from the acquired data.

FIG. 6A shows a range of DAS VSP field data traces. Graph 602 shows DAS data traces that exhibit zigzag noise surrounded by box 604 and other traces outside of the box 604 that do not exhibit zigzag noise. The seismic signal is visible as a first arrival event across all channels, but is contaminated with reverberatory noise signal in the group of traces that correspond to zigzag noise.

FIG. 6B shows the autocorrelation of each trace of FIG. 6A. Graph 612 displays the autocorrelation of each trace included in FIG. 6A as a function of channel number (on x-axis 618) and lag $\ell$ in ms (on y-axis 616). White regions on the field of graph 612 correspond to negative values of the autocorrelation, while black regions correspond to large positive values of the autocorrelation function. The autocorrelation function exhibits the periodicity and crossing pattern of peaks characteristic of zigzag noise inside of box 614, which includes the autocorrelation values corresponding to traces included in the box 604 of FIG. 6A. The autocorrelation also displays some periodicity, at a period of approximately $\tau \approx 5$ ms, for DAS data traces that do not exhibit characteristic zigzag noise response (i.e. those traces outside of box 614). However, autocorrelation values for traces with zigzag noise also show the characteristic crossing peaks and central maximum characteristic of zigzag noise along with a zigzag noise of period $\tau \approx 50$ ms. The higher frequency periodicity does not exhibit crossing peaks with central maximums, and the zigzag noise identifier differentiates high frequency instability noise from zigzag noise.

FIG. 6C shows the crosswise lag summation function operating on the autocorrelation data of FIG. 6B. Graph 622 shows the crosswise lag summation function value (on the x-axis 628) as a function of lag $\ell$ (plotted on y-axis 626). A maximum peak 624 corresponds to the smallest periodicity of the autocorrelation, where peak center 620 occurs at lag $\ell \approx 50$ ms.

FIG. 6D shows the results of applying the reverse deconvolution method to the data of FIG. 6A. The time-reversed deconvolution applied to the group of data traces included in the box 604 of FIG. 6A yields the group of replacement noise mitigated data traces enclosed by box 634 on graph 632. Time-reversed deconvolution is applied to the acquired data traces that are first identified as corresponding to zigzag noise, and second identified as having a specific zigzag noise frequency. In this embodiment, the zigzag noise remover operates time-reversed deconvolution based on the determined zigzag noise frequency within the identified group of traces suffering from zigzag noise. The zigzag noise is identified in the acquired data and subtracted from each of the group of traces to create a group of replacement traces where zigzag noise is mitigated. The group of mitigated traces are then rejoined with the DAS data traces that do not exhibit zigzag noise (i.e. traces outside of the box 634) in order to create a complete DAS data set from which reservoir information may be extracted.

FIG. 6E shows the result of applying the time-limited operator to the data of FIG. 6A. The time-limited comb operator extraction method applied to the group of data traces included in box 604 of FIG. 2A yields the group of replacement noise mitigated data traces enclosed by box 644 on graph 642. First the zigzag noise identifier identifies groups of traces as containing zigzag noise, then the zigzag noise identifier extracts the zigzag noise frequency from the autocorrelation data using the crosswise lag summation function. In this embodiment, the zigzag noise remover then creates a time-limited comb operator with tines at the zigzag noise periodicity. The time-limited comb operator is convolved with each trace in the group of DAS data traces containing zigzag noise in order to identify noise signals occurring at the zigzag frequency. For each $T_0$ at which the time-limited comb operator detects signal greater than a minimum value, zigzag noise is identified. The set of times where zigzag noise occurs, for each trace, are then summed and subtracted from the acquired data. The time-limited comb operator concentrates any noise occurring at the zigzag frequency in order to ensure all such noise is subtracted from the acquired data. Subtraction of the zigzag noise generates noise mitigated DAS data traces for each of the group of traces containing zigzag noise. The noise mitigated traces are then rejoined with the acquired DAS data traces which do not contain zigzag noise in order to create a set of full channel DAS data.

Figure 7:
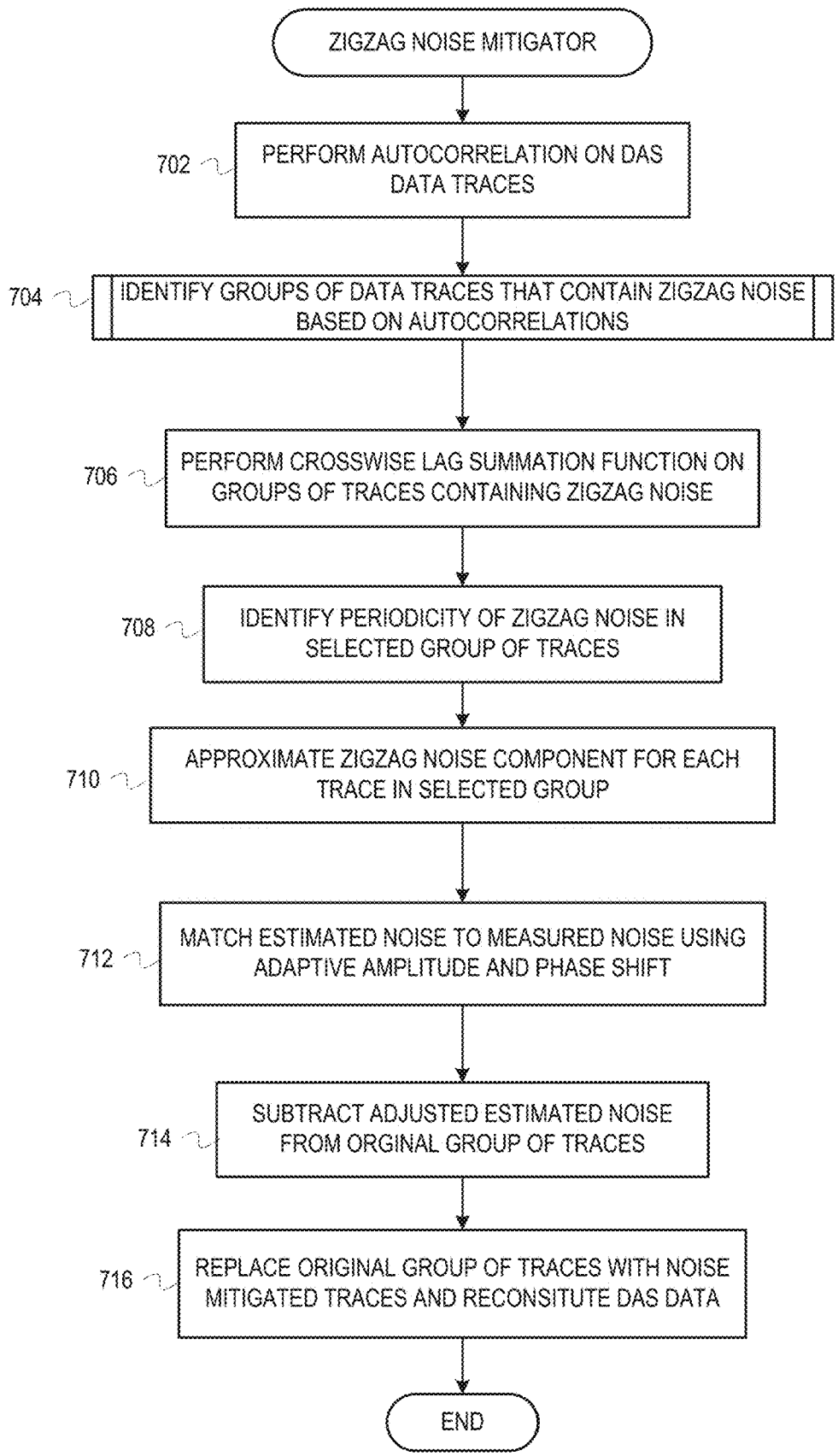
FIG. 7 depicts a flowchart of example operations for mitigating noise in fiber optic acoustic sensing data.

FIG. 7 depicts a flowchart of example operations for mitigating noise in fiber optic acoustic sensing data. The operations are described as being performed by the zigzag noise mitigator for consistency with the earlier description. However, program code naming, organization, and deployment can vary due to arbitrary programmer choice, programming language(s), platform, etc.

At block 702, the zigzag noise mitigator performs autocorrelations on acquired DAS data traces. For each channel identifier, the zigzag noise mitigator calculates the autocorrelation (from Eq. 2) as a function of time lag $\ell$, where $0 \leq \ell \leq \ell_{max}$ and $\ell_{max} \gg \tau$ where $\tau$ is the suspected first cycle period.

At block 704, the zigzag noise mitigator identifies groups of data traces by channel number which contain zigzag noise based on the autocorrelation. Zigzag noise occurs along the wireline and encompasses multiple channels. For instance, a group of only two channels does not exhibit mitigatable zigzag noise. A minimum group size where $chan_{max} - chan_{min} > j_{group}$ can be selected such that the zigzag noise mitigator only operates on groups of traces exhibiting zigzag noise that contain more than a minimum number of channels $j_{group}$. The zigzag noise mitigator identifies groups of channels where characteristic periodicity is detected in the autocorrelation data—i.e. autocorrelation that exhibits periodicity on the order of $\tau$ and crossing maximum peaks occur as $$j = \frac{chan_{max} - chan_{min}}{2}.$$

At block 706, the zigzag noise mitigator performs the crosswise lag summation function on each group of identified traces. The summation according to Eq. 3 results in a maximum at the shortest periodicity time for the zigzag noise.

At block 708, the zigzag noise mitigator calculates periodicity for each group of traces containing zigzag noise based on the crosswise lag summation function. The zigzag noise mitigator determines, based on crosswise lag summation function maximum value for the group of traces, a shortest periodicity time exhibited in the autocorrelation and sets that time lag as the detected periodicity for traces within the group. If the zigzag noise mitigator cannot identify a period for the zigzag noise from the crosswise lag summation function, the minimum group size can be increased so that the group of traces is no longer considered for zigzag noise identification or the channels included in the group can be adjusted (either more channels can be included or fewer channels from near $chan_{min}$ and $chan_{max}$) until a periodicity is identified. The group of traces together with the zigzag noise period comprise the identified zigzag noise.

At block 710, the zigzag noise mitigator estimates the zigzag noise. The zigzag noise mitigator can estimate based on a time-reversed deconvolution, predictive deconvolution, time-limited comb operator or another of the previously described methods. The zigzag noise mitigator approximates or estimates a noise signal that corresponds to the zigzag noise occurring at the identified period for the group of traces. The noise signal can have identical upward and downward traveling periods, or can have different periods for upward and downward traveling noise waves. The upward noise and downward noise are separable and can be mitigated by different methods, approximated at different periods, or can be mitigated singularly. The upward and downward traveling noise waves are often reflections of each other, but reflection points may not exhibit elastic momentum transfer. Upward and downward traveling noise waves may be better approximated by different periods or the same period, even for different groups of traces occurring in response to the same seismic event in the same wellbore.

At block 712, the zigzag noise mitigator optionally adjusts the estimated noise signal to the measured noise using one or both of adaptive amplitude adjustment or phase shift adjustment. Both of these embodiments will be further discussed in reference to the flowchart of FIG. 11.

At block 714, the zigzag noise mitigator subtracts estimated (and adjusted) noise from the DAS data of the identified group of traces. The difference between the acquired DAS traces and the estimated noise produces the mitigated DAS data traces for each of the traces in the group.

At block 716, the zigzag noise mitigator replaces the acquired DAS data traces in the group containing zigzag noise with the mitigated DAS data traces. The mitigated DAS data traces are joined with the DAS data traces for channels without mitigatable zigzag noise in order to reconstitute the DAS data for all channels. Further calculations can be performed directly on the reconstituted DAS data, which functions as if the DAS data was acquired without any traces of zigzag noise.

Figure 8:
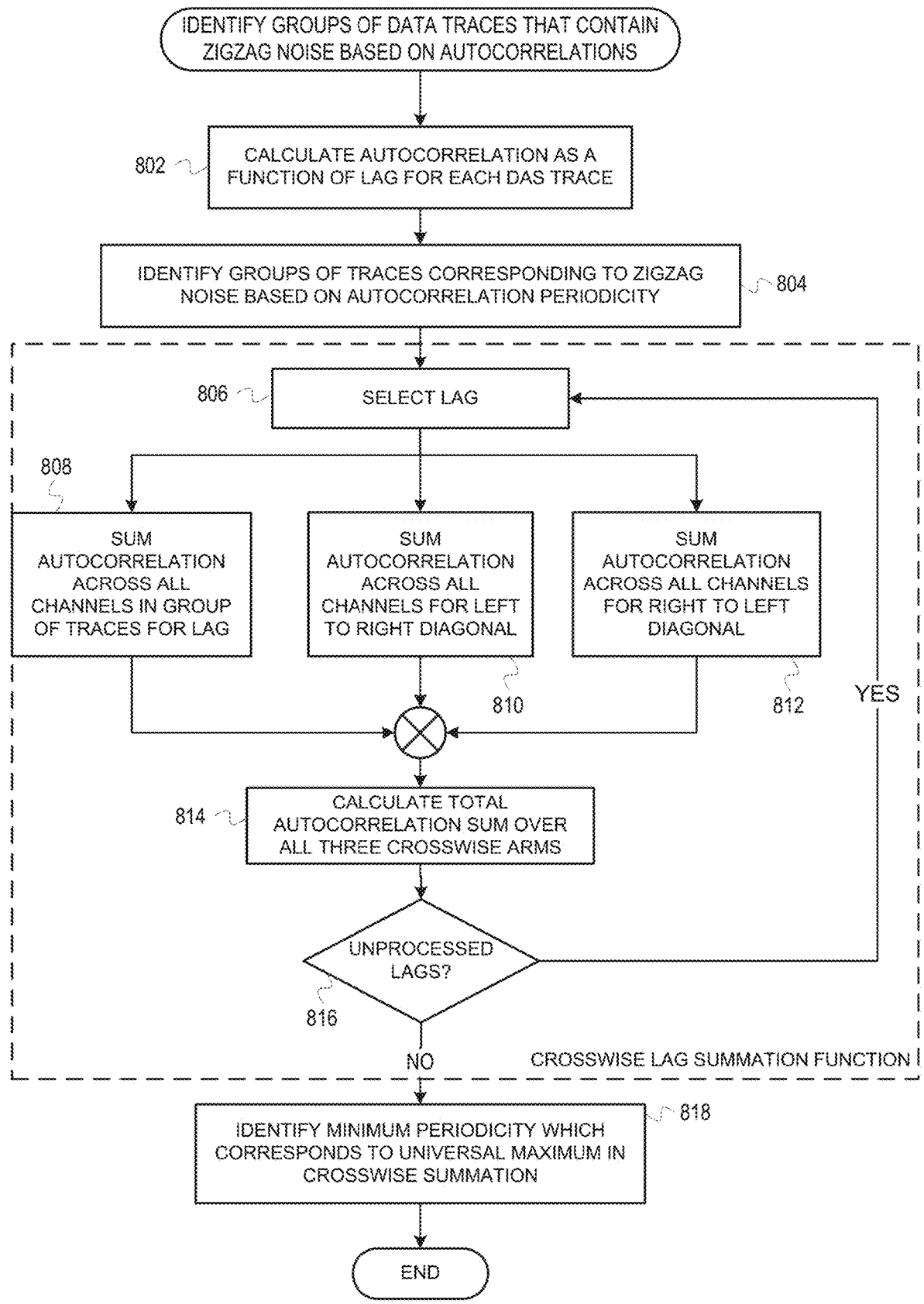
FIG. 8 depicts a flowchart of example operations for the zigzag noise identifier.

FIG. 8 depicts a flowchart of example operations for identifying groups of data traces that contain zigzag noise based on convolutions from autocorrelation performed on the data traces. The zigzag noise identifier is a portion of the zigzag mitigator the flowchart of FIG. 7 that identifies groups of traces as containing zigzag noise and identifies one or more characteristic periods for the zigzag noise for each group of traces. The zigzag noise identifier can operate without any noise mitigation component or as a portion of the zigzag noise mitigator.

At block 802, the zigzag noise identifier calculates an autocorrelation value for each trace of the acquired DAS data for time lags $\ell$, where $0 \leq \ell \leq \ell_{max}$ and $\ell_{max} \gg \tau$ where $\tau$ is an approximate first cycle period for zigzag noise in the wellbore. $\tau$ can be approximated from the length of the wireline and realistic speeds at which reverberatory noise waves travel.

At block 804, the zigzag noise identifier identifies groups of traces by channel number which contain zigzag noise, based on the periodicity of the autocorrelation function. As previously mentioned, a minimum group size where $chan_{max} - chan_{min} > j_{group}$ can be selected such that the zigzag noise identifier operates on groups of traces exhibiting zigzag noise that contain more than a minimum number of channels $j_{group}$. The zigzag noise identifier locates groups of channels where characteristic periodicity is detected in the autocorrelation data—i.e. autocorrelation that exhibits periodicity on the order of $\tau$ and crossing maximum peaks occur as $$j = \frac{chan_{max} - chan_{min}}{2}.$$

$Chan_{min}$ and $chan_{max}$ identify the boundary channel numbers that define the group of traces.

At block 806, for each group of traces containing identified zigzag noise a first lag $\ell$ is selected where and the autocorrelation value is summed over all channels where $chan_{min} \leq j \leq chan_{max}$. Once a specific lag $\ell$ is selected, the process continues to block 808, 810, and 812 for independent summation over the crosswise portions of the crosswise lag summation function.

At block 808, the autocorrelation value is summed over all channels of the group for lag $\ell$. This corresponds to the $R_j(\ell)$ portion of Eq. 3.

At block 810, the autocorrelation value is summed over all channels of the group for the left to right diagonal between ($\ell=0$, $j=chan_{min}$) and ($\ell$, $j=chan_{max}$). This corresponds to the $R_j(\lambda)$ portion of Eq. 3 where $\lambda$ is governed by Eq. 4.

At block 812, the autocorrelation value is summed over all channels of the group for the right to left diagonal between ($\ell=0$, $j=chan_{max}$) and ($\ell$, $j=chan_{min}$). This corresponds to the $R_j(\rho)$ portion of Eq. 3 where $\rho$ is governed by Eq. 5.

At block 814, the zigzag noise identifier calculates the total crosswise lag summation function by summing all three arms of the autocorrelation function. Each time lag $\ell$ produces a single value of the crosswise lag summation function for an identified group of traces.

At block 816, the zigzag noise identifier determines if the crosswise lag summation function should be calculated for more lags. This can include a determination if $\ell_{max} \gg \upsilon$ has been reached by setting a requiring that a maximum value of $X(\ell)$ greater than a signal to noise ratio or other minimum value has been detected. Alternatively, a range for time lag $\ell$ can be selected as a predetermined value of $\ell_{max}$. If time lags remain to be calculated, the zigzag noise identifier selects another lag $\ell$, such as $\ell_{new} = \ell + 1$ where 1 corresponds to the sample size (i.e. the new lag is the next lag in sequence) and flow continues at block 806. If no lags remain unprocessed, flow continues to block 818.

At block 818, the zigzag noise identifier identifies the universal maximum for the crosswise lag summation function operating on the identified group of traces. The lag $\ell$ which corresponds to center of a peak, or directly to the universal maximum, corresponds to the periodicity of the zigzag noise. The zigzag noise identifier may employ peak fitting, such as a gaussian distribution, to identify the center of a peak including a non-symmetrical peak. The zigzag noise identifier then outputs the identified zigzag noise. The identified zigzag noise consists of a group of traces and their channel numbers together with the identified period, i.e. the smallest periodicity, of zigzag noise in those traces.

Figure 9:
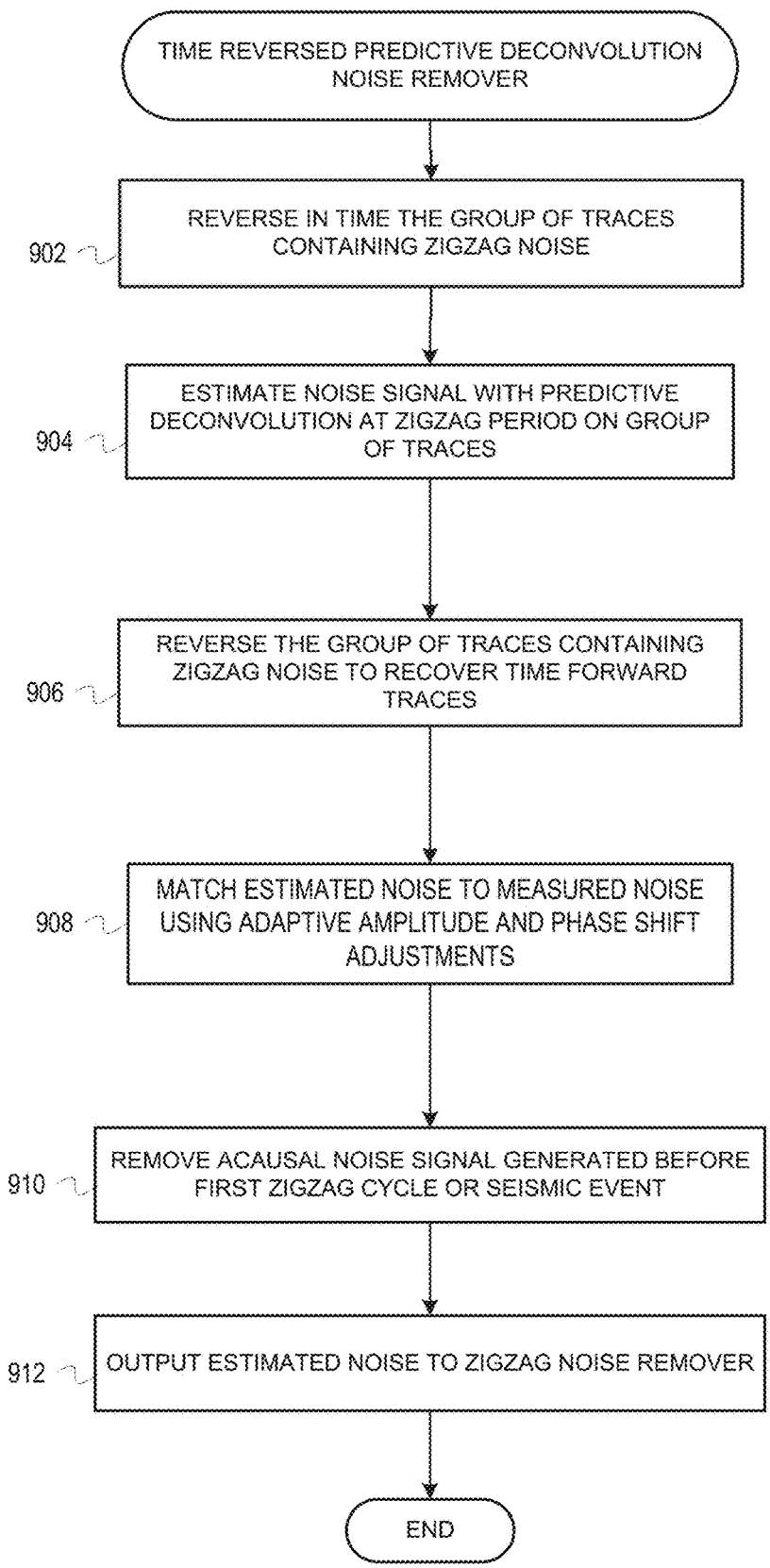
FIG. 9 depicts a flowchart of example for mitigating noise in fiber optic acoustic sensing data using time-reversed predictive deconvolution.

FIG. 9 depicts a flowchart of example for mitigating noise in fiber optic acoustic sensing data using time-reversed predictive deconvolution. In an embodiment, the zigzag noise remover generates an estimated noise signal by a method of time-reversed predictive convolution. The estimated noise signal can be subtracted from acquired DAS data traces by the zigzag noise remover or by operations of the zigzag noise mitigator.

At block 902, the time-reversed predictive deconvolution noise remover operates to reverse all traces in time for the group of traces identified as containing zigzag noise by the zigzag noise identifier. By reversing each trace of these groups in time, the operator enables a standard predictive deconvolution to identify more zigzag noise (other than for the first trace and earlier times) in the acquired DAS data traces than can be identified in the standard predictive deconvolution in the time forward direction.

At block 904, the time-reversed predictive deconvolution noise remover estimates a noise signal for the zigzag noise occurring at the smallest periodicity as determined by the zigzag noise identifier.

At block 906, the time-reversed predictive deconvolution noise remover reverses the traces in time again to recover the time-forward group of DAS data traces. The time-reversed predictive deconvolution noise remover may optionally switch the DAS data traces between time forward and time-reversed time scales, or may be constructed to work in the negative time direction on the DAS data traces in the time forward time scale. Traces are converted between time forward and time reversed by multiplication by (−1) in time.

At block 908, the time-reversed predictive deconvolution noise remover optionally matches the estimated noise to the measured noise using adaptive amplitude and phase shift adjustment. The estimated noise is scaled in time phase and amplitude to more closely match the acquired data.

At block 910, the time-reversed predictive deconvolution noise remover removes any signal from the estimated noise that precedes the first cycle of zigzag noise or the seismic event. Any estimated noise that occurs before the first cycle of zigzag noise is an artifact of the time-reversed predictive deconvolution, and not a seismic signal. The acausal early noise may optionally be removed from the mitigated DAS data traces, after the estimated noise is subtracted from the acquired data.

At block 912, the estimated noise signal for each data trace of the group of identified traces is output to the zigzag noise remover. The estimated noise is then subtracted from the acquired DAS data traces in order to recover the mitigated DAS traces without zigzag noise to be rejoined in a full DAS data set for all channel numbers.

Figure 10:
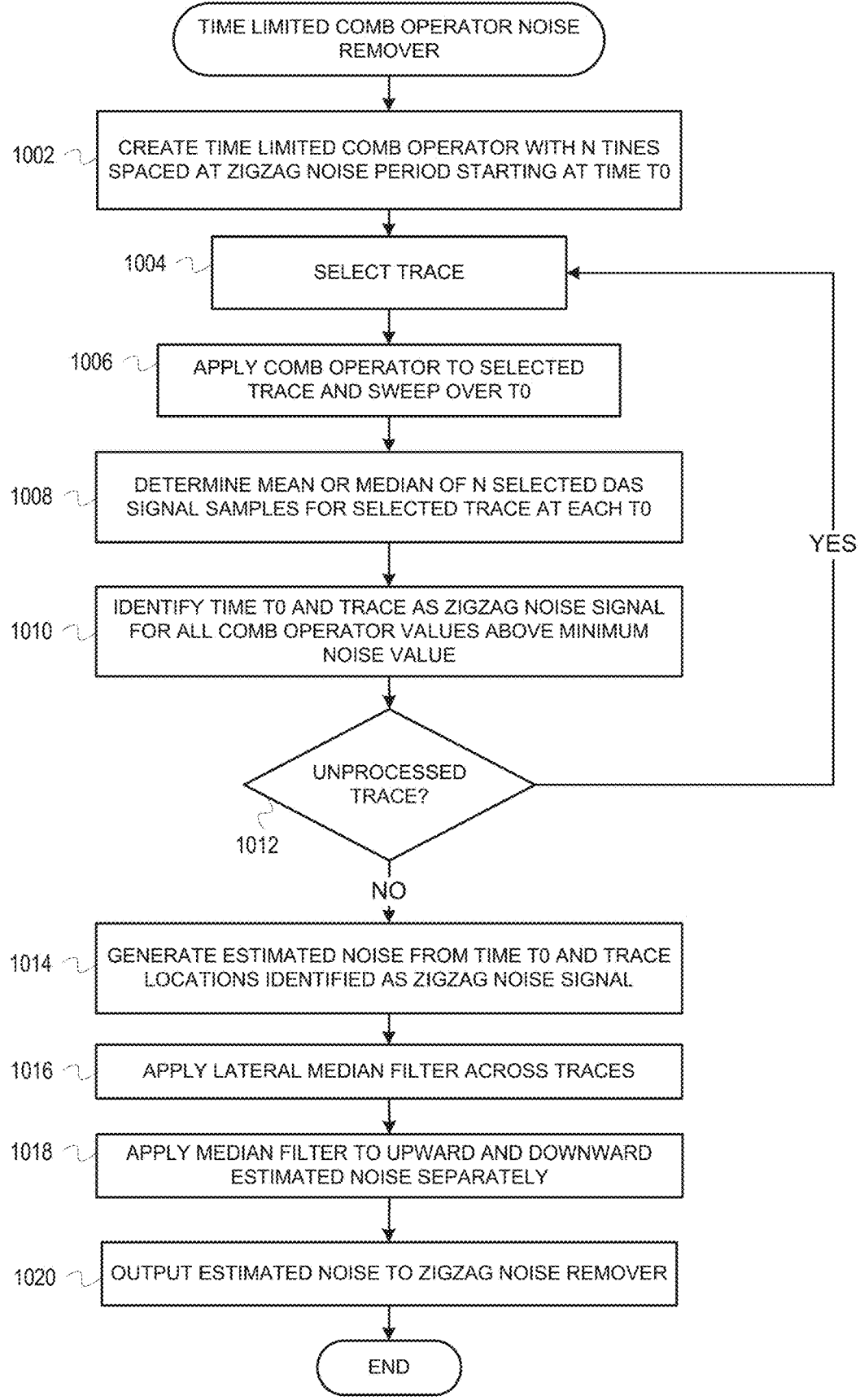
FIG. 10 depicts a flowchart of example operations for mitigating noise in fiber optic acoustic sensing data using a time limited comb operator noise remover.

FIG. 10 depicts a flowchart of example operations for mitigating noise in fiber optic acoustic sensing data using a time limited comb operator noise remover. In one embodiment, the zigzag noise removed estimates the noise signal corresponding to zigzag noise that is to be removed via convolution of selected data traces with a time-limited comb operator.

At block 1002, the time-limited comb operator noise remover creates a time limited comb operator with n tines spaces at the zigzag noise period $\tau$, as determined by the zigzag noise identifier. The time-limited comb operator noise remover creates a time-limited comb operator for each group of traces containing identified zigzag noise. At each of n tines, the time-limited comb operator is equal to one and has a value of zero at all other times. The number of tines n is selected to maximize noise identification while minimizing complexity and length of calculations. Each tine has a width the size of a single DAS data point (i.e. the width of a DAS sample recorded at a time). The time-limited comber operator starts at a time $T_0$ where $T_0$ is a value of time for the selected DAS data traces. For DAS data traces beginning at time 0 $T_0$ is limited to $0 \leq T_0 \leq T_{max}-(n+1)\tau$, which means $T_0$ for the comb operator functions when all tines of the comb operator fall within valid times for the group of DAS data traces.

At block 1004, one data trace of the group of DAS data traces identified as containing zigzag noise is selected. Each trace belonging to the group of DAS data traces which contain zigzag noise is investigated for noise individually.

At block 1006, the time-limited comb operator is applied to the selected DAS data trace. The time-limited comb operator selects from the DAS data trace, n values of DAS data. The n selected values can be summed, averaged, or the median can be determined as long as all traces for all times are subjected to the same mathematical method. The time-limited comb operator produces a value for each value or sample of $T_0$. The time-limited comb operator is swept through all available values of $T_0$ so that the time-limited comb operator records values for each sample included in the selected trace.

At block 1008, the time-limited comb operator determines the sum, mean, or median for the n selected sample signals corresponding to each $T_0$.

At block 1010, the time-limited comb operator identifies values of $T_0$ for which the time-limited comb operator produces a value greater than a minimum value for noise $V_{noise}$. Each sample that corresponds to a value greater than $V_{noise}$ is tagged as corresponding to zigzag noise.

At block 1012, the time-limited comb operator noise remover determines if all traces of the selected group have been processed to determine samples containing noise. If traces remain to be processed, the noise remover continues to block 1004 and selects an additional trace. If all traces belonging to the group identified as containing zigzag noise by the zigzag noise identifier are processed, flow continues to block 1014.

At block 1014, the noise remover consolidates all samples for all traces identified as corresponding to noise into an estimate noise signal. The estimate noise signal contains samples for all traces and all times included in the group of traces identified as corresponding to zigzag noise.

At block 1016, an optional lateral median filter is applied to the estimated noise signal. The estimated noise is filtered laterally, i.e. across traces for all selected channel numbers, to remove or smooth the estimated noise generated by the time-limited comb operator. The time-limited comb operator can over sample noise and include samples as noise that are separated in time and channel from other samples identified as noise. A lateral median filter removes disparate samples from the estimated noise, making it a more accurate representation of zigzag noise signal.

At block 1018, an optional median filter is applied to the estimate noise signal in the time direction. Upward and downward traveling portions of the zigzag noise may travel at different velocities or moveout speeds. The upward and downward portions of the estimated noise are separable and can be adjusted to better estimate the acquired data. Each portion of the estimated noise can also be smoothed separated, such as with two median filters in the time direction where the upward noise filter and the downward noise filter may have different smoothing radii as well as different offsets.

At block 1020, the estimate noise (after any optional filtering) is output to the zigzag noise remover. The estimated zigzag noise signal is then subtracted from the group of acquired DAS traces that correspond to zigzag noise.

Figure 11:
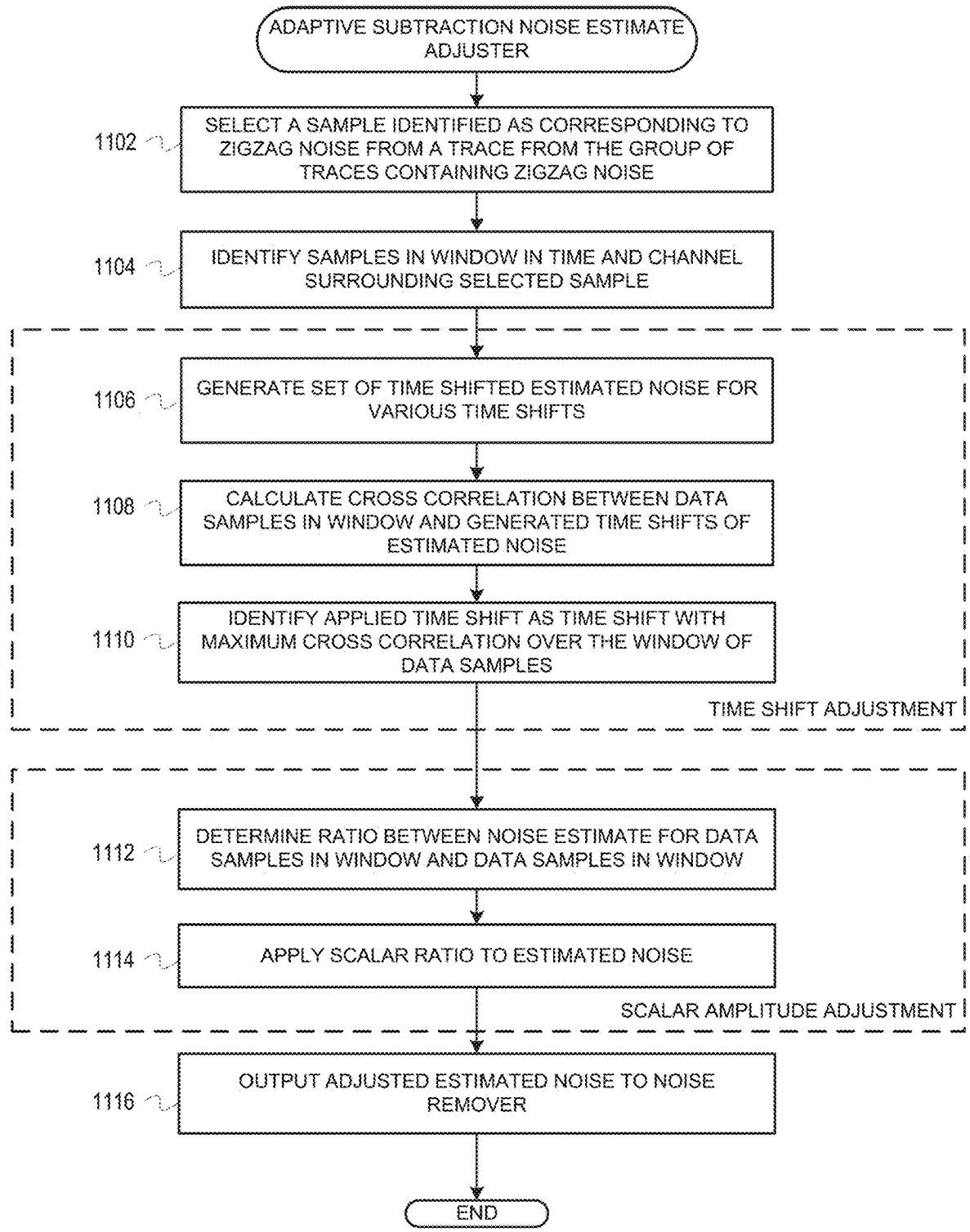
FIG. 11 depicts a flowchart of example operations for adaptive amplitude and time shift adjustments to estimated noise.

FIG. 11 depicts a flowchart of example operations for adaptive amplitude and time shift adjustments to estimated noise. Estimated noise produced by various embodiments can be adjusted in both time and amplitude to more completely match the zigzag noise present in a group of DAS data traces. An adaptive subtraction noise estimate adjuster operator, which may be part of any other noise estimator operator herein described or may be optionally omitted, functions to adjust the estimated noise to better match the noise present in the acquired DAS data traced.

At block 1102, the adaptive subtraction noise estimate adjuster or other operator selects a sample (i.e. DAS data for a time and channel identifier) that corresponds to noise. The sample may be a single measurement present in a noisy trace or a group of measurements.

At block 1104, the adjuster selects or identifies a group of samples in a window that surround the selected sample. The selection window size in both time and channel number can be determined by an operator, determined by a filter, predetermined based on data parameters such as a minimum signal amplitude, or limited by measurement parameters such as a maximum included channel width.

At block 1106, the adjuster generates a set of time shift estimated noise by shifting the estimated noise calculated by any zigzag noise identifier at various increments of time. The time shifts selected are on the order of ten times smaller than the period calculated for the estimated zigzag noise.

At block 1108, the adjuster calculates the cross correlation between the data samples included in the selection window and each of the generated time shifted estimated noise signals.

At block 1110, the adjuster determines for which time shift the estimated noise produces the maximum value of cross correlation when applied to the samples in the selection window. The noise estimate adjuster then uses this time shifted estimated noise for adaptive subtraction noise removal, or further adjusts estimated noise by a scalar amplitude adjustment at block 1112. The adjuster may determine that more time shifted estimated noise must be generated if the maximum cross correlation occurs at or close to the maximum or minimum time shift previously generated. In this case, flow will continue back to block 1106 to generate more time shifted estimated noise and further calculate cross correlations.

At block 1112, the adaptive subtraction noise estimate adjuster determines a ratio between the data samples included in the selection window and the estimated noise for the selection window. The ratio may be calculated by a normalization factor $$A_{scalar} = \frac{\sum_{t_a}^{t_b} \sum_{chan_a}^{chan_b} f(chan, t) g(chan, t)}{\sum_{t_a}^{t_b} \sum_{chan_a}^{chan_b} g(chan, t) g(chan, t)} \quad \text{Eq. 6}$$

Where f(n)=f(chan, t) is the acoustic signal or input DAS data as a function of time and channel number and g(chan, t) is the estimated noise acoustic signal as a function of time and channel number. The dot products of the input and estimate acoustic signals are calculated over the selected window with time $t_a<t<t_b$ and channel number $chan_a<chan<chan_b$. The ratio may also be determined from the slope of a line fitted to the cross plot of input signal amplitude versus estimated noise signal amplitude over the selected window.

At block 1114, the estimated noise is multiplied by the scalar amplitude adjustment factor to produce an adjusted estimated noise. The estimated noise can be adjusted by either the time shift adjustment or the scalar amplitude adjustment, or can be adjusted sequentially in both time and amplitude to better match the acquired DAS signal corresponding to zigzag noise.

At block 1116, the adjusted estimated noise is output to any embodiment of the noise remover for removal from the acquired data.

Figure 12:
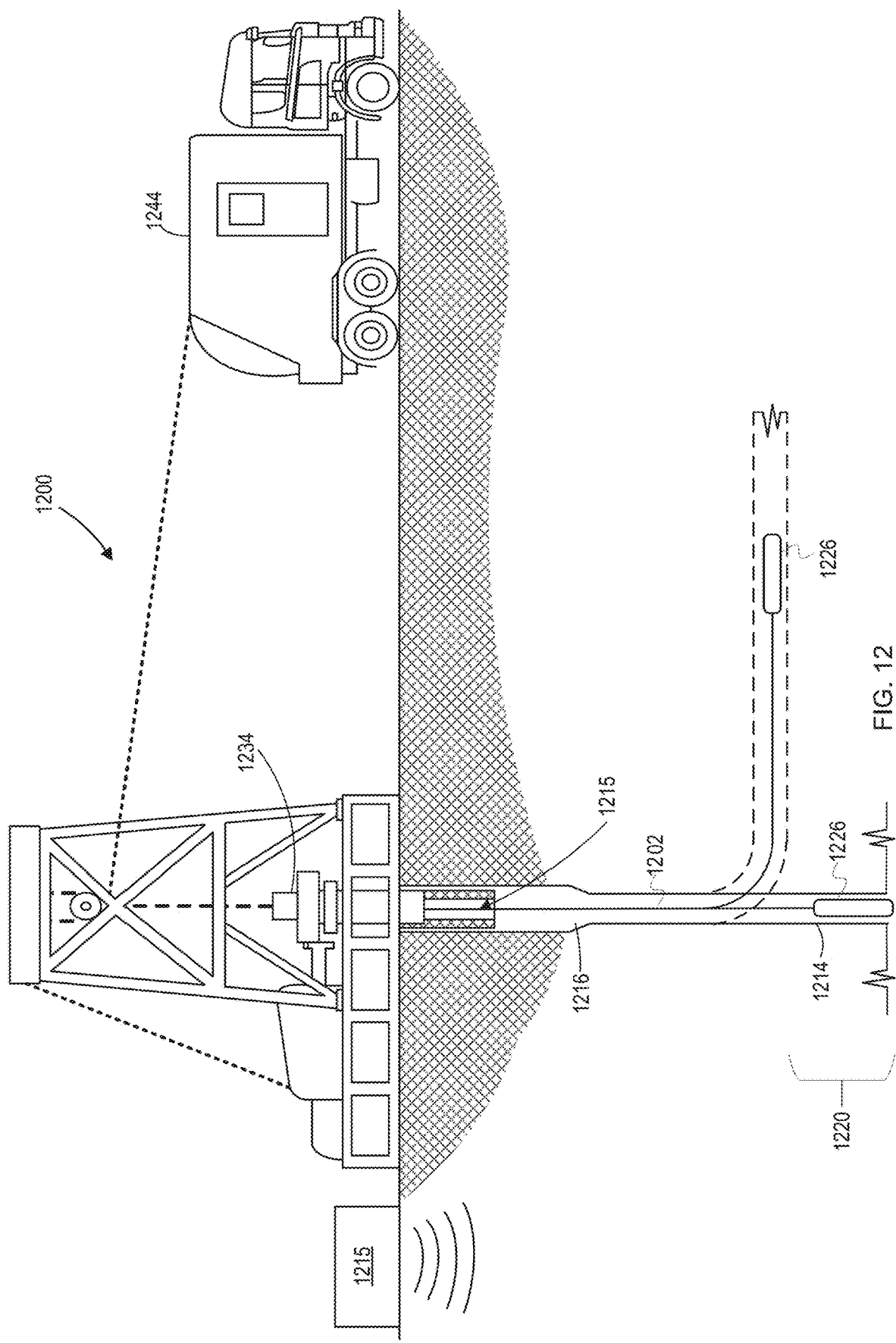
FIG. 12 depicts an example wireline well logging system that includes a retrievable fiber optic cable for DAS.

FIG. 12 depicts an example wireline well logging system that includes a retrievable fiber optic cable for DAS. A system 1200 can be used in an illustrative logging environment with a drillstring removed, in accordance with some embodiments of the present disclosure.

Subterranean operations may be conducted using a wireline system 1220 once the drillstring has been removed, though, at times, some or all of the drillstring may remain in a borehole 1214 during logging with the wireline system 1220. The wireline system 1220 may include one or more logging tools 126 that may be suspended in the borehole 1214 by a conveyance 1215 (e.g., a cable, slickline, or coiled tubing). The wireline conveyance 1215 may contain an optical fiber 1202 or the optical fiber 1202 may be secured to the wireline conveyance 1215 for retrievable deployment into the borehole 1214. The logging tool 1226 may be communicatively coupled to the conveyance 1215. The conveyance 1215 may contain conductors for transporting power to the wireline system 1220 and telemetry from the logging tool 1226 to a logging facility 1244. Alternatively, the conveyance 1215 may lack a conductor, as is often the case using slickline or coiled tubing, and the wireline system 1220 may contain a control unit 1234 that contains memory, one or more batteries, and/or one or more processors for performing operations and storing measurements.

In certain embodiments, the control unit 1234 can be positioned at the surface, in the borehole (e.g., in the conveyance 1215 and/or as part of the logging tool 1226) or both (e.g., a portion of the processing may occur downhole and a portion may occur at the surface). The control unit 1234 may include a control system or a control algorithm. In certain embodiments, a control system, an algorithm, or a set of machine-readable instructions may cause the control unit 1234 to generate and provide an input signal to one or more elements of the logging tool 1226, such as the sensors along the logging tool 1226. The input signal may cause the sensors to be active or to output signals indicative of sensed properties. The logging facility 1244 (shown in FIG. 12 as a truck, although it may be any other structure) may collect measurements from the logging tool 1226, and may include computing facilities for controlling, processing, or storing the measurements gathered by the logging tool 1226. The computing facilities may be communicatively coupled to the logging tool 1226 by way of the conveyance 1215 and may operate similarly to the control unit 1234. In certain example embodiments, the control unit 1234, which may be located in logging tool 1226, may perform one or more functions of the computing facility.

The logging tool 1226 includes a mandrel and a number of extendible arms coupled to the mandrel. One or more pads are coupled to each of the extendible arms. Each of the pads have a surface facing radially outward from the mandrel. Additionally, at least sensor disposed on the surface of each pad. During operation, the extendible arms are extended outwards to a wall of the borehole to extend the surface of the pads outward against the wall of the borehole. The sensors of the pads of each extendible arm can detect image data to create captured images of the formation surrounding the borehole.

Figure 13:
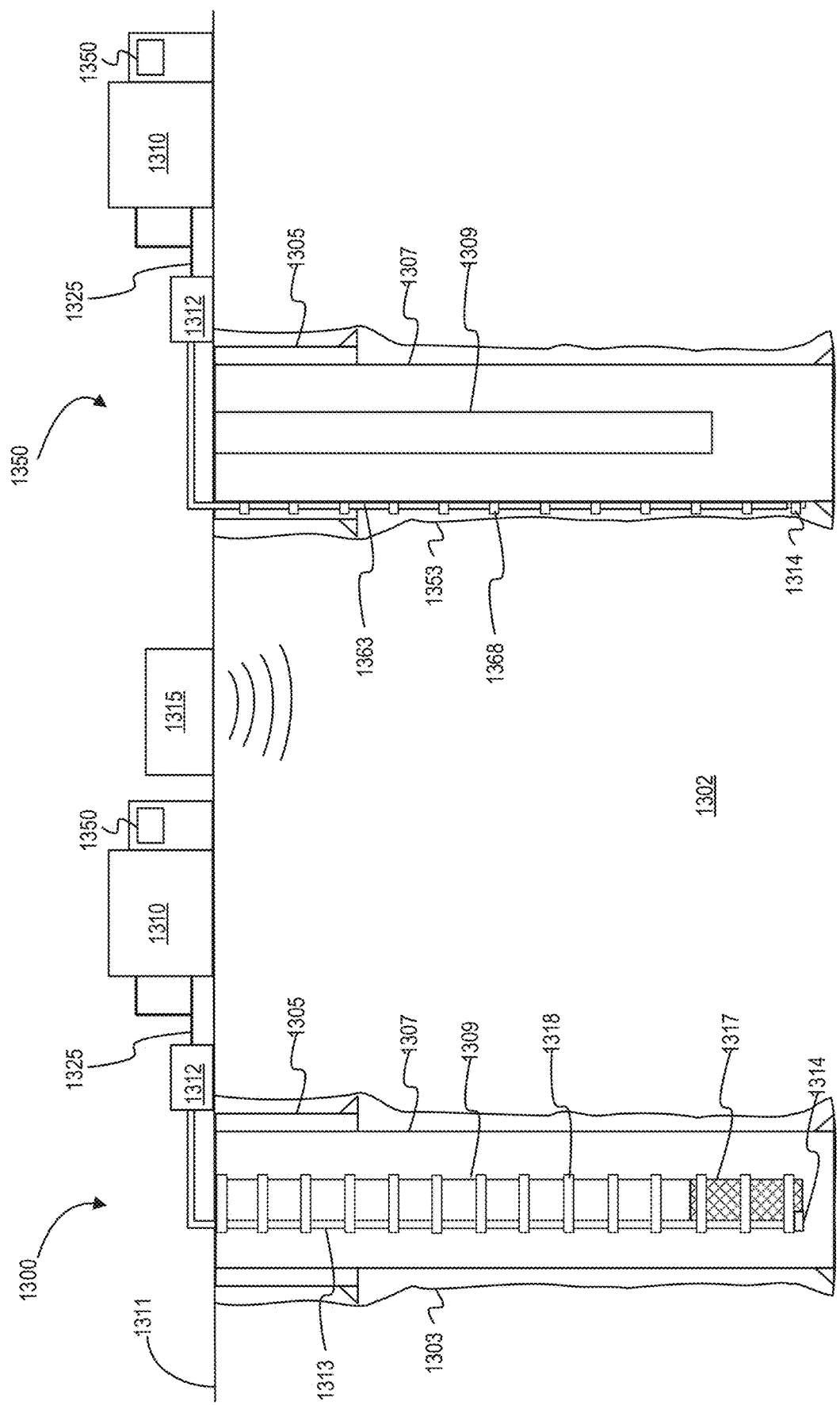
FIG. 13 is an elevation view of a borehole that includes a DAS system connected to an optical fiber fixed to the outside of the tubing of a cased borehole and a view of a borehole that includes a DAS system connected to an optical fiber fixed to the outside of the production casing of a cased borehole.

FIG. 13 is an elevation view of a borehole that includes a DAS system connected to an optical fiber fixed to the outside of the tubing of a cased borehole and a view of a borehole that includes a DAS system connected to an optical fiber fixed to the outside of the production casing of a cased borehole. A borehole 1303 in the subterranean formation 1302 includes a DAS system 1300 connected to an optical fiber fixed to the outside of the tubing of the cased borehole that can detect seismic disturbances generated by a seismic source 1315 on an earth surface 1311. The borehole 1303 can be a completion well (i.e. a well ready for production or injection following a drilling process) having a surface casing 1305, a production casing 1307 inside the surface casing 1305, and a tubing 1309 inside the production casing 1307. In some embodiments, the tubing 1309 can be a casing string, production string, an armored wireline, a slickline, a coiled tubing, a work string, etc. The DAS system 1300 includes an optical fiber 1313 that is fixed to the outer perimeter of the tubing 1309. Cross-coupling protectors such as a cross-coupling protector 1318 can be used to fix the optical fiber 1313 to the tubing 1309. In addition, a tubing tail 1317 can also be fixed to the optical fiber 1313 and extend below the bottom of the tubing 1309.

In some embodiments, the optical fiber can be connected to a DAS signal acquisition system 1312 that includes a DAS interrogator. The DAS interrogator in the DAS signal acquisition system 1312 can be directly coupled to the optical fiber 1313. Alternatively, the DAS interrogator can be coupled to a fiber stretcher module in the DAS signal acquisition system 1312, wherein the fiber stretcher module is coupled to the optical fiber 1313. The DAS signal acquisition system 1312 can receive DAS measurement values taken and/or transmitted along the length of the optical fiber 1313. In addition, the DAS signal acquisition system 1312 can receive DAS measurement values from a bottom hole gauge carrier 1314 that transmits measurements through the optical fiber 1313. In some embodiments, the bottom hole gauge carrier 1314 can include a pressure temperature gauge and can be inside of or replaced by a wireline tool.

DAS measurement values transmitted through the optical fiber 1313 can be sent to the DAS signal acquisition system 1312 at the surface. The DAS interrogator of the DAS signal acquisition system 1312 can be electrically connected to a digitizer to convert optically-transmitted measurements into digitized measurements. A computing device 1310 can collect the electrically-transmitted measurements from the DAS signal acquisition system 1312 using a connector 1325. The computing device can have one or more processors and a memory device to analyze the measurements and graphically represent analysis results on the display device 1350. In addition, the computing device 1310 can communicate with components attached to the optical fiber 1313. For example, the computing device 1310 can send control signals to the bottom hole gauge carrier 1314 to modify gauge measurement parameters. Additionally, in some embodiments, at least one processor and memory device can be located downhole for the same purposes. With the optical fiber 1313 positioned inside a portion of the borehole 1303, the DAS signal acquisition system 1312 can obtain information associated with the subterranean formation 1302 based on seismic/acoustic disturbances (e.g. seismic disturbances caused by the seismic source 1315). Relative to other positions, fixing the optical fiber 1313 to the outer perimeter of the tubing 1309 can increase the sensitivity of DAS measurements to changes in the annular region between the production casing 1307 and the tubing 1309.

A borehole 1353 in the subterranean formation 1302 includes a DAS system 1350 connected to an optical fiber fixed to the outside of the production casing of a cased borehole that can detect seismic disturbances generated by a seismic source 1315 on an earth surface 1311. The borehole 1353 can be a completion well (i.e. a well ready for production or injection following a drilling process) having a surface casing 1305, a production casing 1307 inside the surface casing 1305, and a tubing 1309 inside the production casing 1307. In some embodiments, the tubing 1309 can be a casing string, production string, an armored wireline, a slickline, a coiled tubing, a work string, etc. The DAS system 1350 includes an optical fiber 1363 that is fixed to the outer perimeter of the production casing 1309. Cross-coupling protectors such as a cross-coupling protector 1368 can be used to fix the optical fiber 1363 to the outer perimeter of the production casing 1309.

In some embodiments, the optical fiber can be connected to a DAS signal acquisition system 1312 that includes a DAS interrogator. The DAS interrogator in the DAS signal acquisition system 1312 can be directly coupled to the optical fiber 1363. Alternatively, the DAS interrogator can be coupled to a fiber stretcher module in the DAS signal acquisition system 1312, wherein the fiber stretcher module is coupled to the optical fiber 1363. The DAS signal acquisition system 1312 can receive DAS measurement values taken and/or transmitted along the length of the optical fiber 1363. In addition, the DAS signal acquisition system 1312 can receive DAS measurement values from a bottom hole gauge carrier 1314 that transmits measurements through the optical fiber 1363. In some embodiments, the bottom hole gauge carrier 1314 can include a pressure temperature gauge and can be inside of or replaced by a wireline tool, etc.

DAS measurement values transmitted through the optical fiber 1363 can be sent to the DAS signal acquisition system 1312 at the surface. The DAS interrogator of the DAS signal acquisition system 1312 can be electrically connected to a digitizer to convert optically-transmitted measurements into digitized measurements. A computing device 1310 can collect the electrically-transmitted measurements from the DAS signal acquisition system 1312 using a connector 1325. The computing device can have one or more processors and a memory device to analyze the measurements and graphically represent analysis results on the display device 1350. In addition, the computing device 1310 can communicate with components attached to the optical fiber 1363. For example, the computing device 1310 can send control signals to the bottom hole gauge carrier 1314 to modify gauge measurement parameters. Additionally, in some embodiments, at least one processor and memory device can be located downhole for the same purposes. With the optical fiber 1363 positioned inside a portion of the borehole 1353, the DAS signal acquisition system 1312 can obtain information associated with the subterranean formation 1302 based on seismic/acoustic disturbances (e.g. seismic disturbances caused by the seismic source 1315). Relative to other positions, fixing the optical fiber 1363 to the outer perimeter of the production casing 1309 can increase the sensitivity of DAS measurements to changes in the formation.

Figure 14:
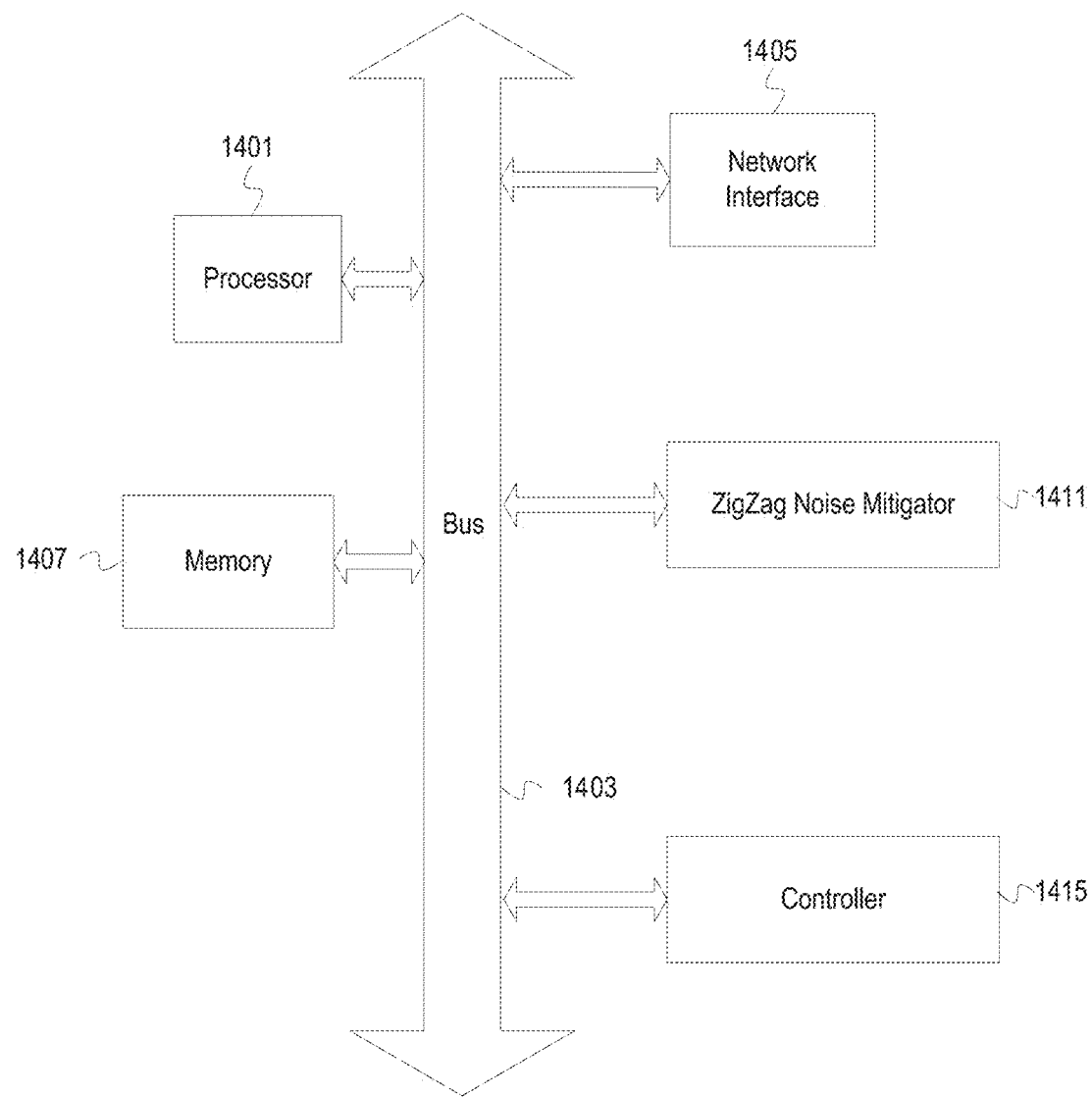
FIG. 14 depicts an example computer.

FIG. 14 depicts an example computer. The computer includes a processor 1401, a memory 1407, a bus 1403, and a network interface 1405 (e.g. a wireless interface, interface for a wired connection, etc.)

The computer also includes a zigzag noise mitigator 1411 and a controller 1415. The zigzag noise mitigator 1411 can mitigate the zigzag noise in the DAS data traces as described variously above. The noise mitigated DAS data can aid the controller 1415 in performing various hydrocarbon recover operations based on the formation evaluation (as described above). Any of the previously described functionalities may be partially (or entirely) implemented in hardware and/or on the processor 1401. For example, the functionality may be implemented with an application specific integrated circuit, in logic implemented in the processor 1401, in a co-processor on a peripheral device or card, etc. Further, realizations may include fewer or additional components not illustrated in FIG. 14 (e.g. video cards, audio cards, additional network interfaces, peripheral device, etc.). The processor 1401 and the network interface 1405 are coupled to the bus 1403. Although illustrated as coupled to the bus 1403, the memory 1407 may be coupled to the processor 1401.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device. The memory 1407 may be system memory or any one or more of the above already described possible realizations of machine-readable media.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

As used herein, the term "or" is inclusive unless otherwise explicitly noted. Thus, the phrase "at least one of A, B, or C" is satisfied by any element from the set {A, B, C} or any combination thereof, including multiples of any element.

Embodiment 1: A method comprising: generating autocorrelation values for distributed acoustic sensing (DAS) acoustic traces acquired at different depths over time in a wellbore; identifying one or more groups of acoustic traces that correspond to zigzag noise based, at least in part, on the autocorrelation values; for each group of acoustic traces that corresponds to zigzag noise, performing a summation of the autocorrelation values as a function of lag; identifying a zigzag noise periodicity based, at least in part, on the summation of the autocorrelation values; generating an estimated noise signal based, at least in part, on the identified zigzag noise periodicity for the group of traces; removing the estimated noise signal from the group of acoustic traces which generates noise mitigated traces; and reconstructing the DAS acoustic traces based, at least in part, on replacing the one or more groups of acoustic traces with the noise mitigated traces for the one or more groups of traces corresponding to zigzag noise.

Embodiment 2: The method of embodiment 1, wherein performing a summation of the autocorrelation as a function of lag comprises: for each value of lag, summing the autocorrelation values over all traces of the group of traces for the value of lag summing the autocorrelation values along a diagonal from zero lag and the channel maximum of the group of traces to the value of lag and the channel minimum of the group of traces; summing the autocorrelation values along a diagonal from zero lag and the channel minimum of the group of traces to the value of lag and the channel minimum of the group of traces; and outputting a crosswise lag summation value based, at least in part, on totaling the three summation legs.

Embodiment 3: The method of embodiment 1 or 2, wherein identifying a zigzag noise periodicity comprises identifying the lag corresponding to the maximum value of the crosswise lag summation.

Embodiment 4: The method of any one of embodiment 1-3, wherein generating estimated noise further comprises adjusting the estimated noise based, at least in part, on the acquired acoustic traces.

Embodiment 5: The method of embodiment 4, wherein adjusting the estimated noise comprises: time shifting the estimated noise by multiple time adjustments to generate a plurality of time shifted estimated noise; calculating a cross correlation of each time shifted estimated noise and the acquired acoustic traces; determining a maximum of the calculated cross correlations; and replacing the estimated noise with the one of the plurality of time shifted estimated noise corresponding to the maximum calculated cross correlation.

Embodiment 6: The method of embodiment 5, wherein adjusting the estimated noise comprises: calculating a scalar ratio based, at least in part, on a dot product of the estimated noise with the acquired acoustic traces divided by a dot product of the estimated noise with itself; and replacing the estimated noise with the estimated noise multiplied by the scalar ratio.

Embodiment 7: The method of any one of embodiments 1 to 6 wherein generating an estimated noise comprises: generating a time-limited comb operator based, at least in part, on the identified zigzag noise periodicity for the group of acoustic traces; identifying times for which each acoustic trace corresponds to zigzag noise based, at least in part, on a value of the convolution of the time-limited comb operator and the acoustic trace; and generating an estimated noise based, at least in part, on the values of each acoustic trace at the identified times.

Embodiment 8: The method of embodiment 8 further comprising: filtering the estimated noise based, at least in part, on a time based filter.

Embodiment 9: The method of embodiment 7 or 8 further comprising: filtering the estimated noise based, at least in part, on filter across acoustic traces.

Embodiment 10: The method of any one of embodiments 1 to 6, wherein generating an estimated noise comprises generating the estimated noise based, at least in part, on predictive deconvolution.

Embodiment 11: The method of embodiment 10, further comprising: time-reversing each of the one or more groups of acoustic traces, wherein removing the estimated noise signal from each group of acoustic traces comprises, removing the estimated noise signal from the time-reversed group of acoustic traces which generates time-reversed mitigated traces; restoring the time-reversed mitigated traces to a time-forward domain which generates mitigated traces; and removing from the group of mitigated traces acausal noise before a first seismic event based, at least in part, on the identified zigzag noise periodicity of the group of acoustic traces which generates noise mitigated traces.

Embodiment 12: A non-transitory machine-readable medium having stored therein program code for mitigating zigzag noise for distributed acoustic sensing (DAS) acoustic traces, the program code comprising instructions to: generate autocorrelation values for distributed acoustic sensing (DAS) acoustic traces acquired at depths over time in a wellbore; identify one or more groups of acoustic traces that correspond to zigzag noise based, at least in part, on the autocorrelation values; for each group of acoustic traces that corresponds to zigzag noise, identify a zigzag noise periodicity based, at least in part, on a summation of the autocorrelation values; generate an estimated noise based, at least in part, on the identified zigzag noise periodicity for the group of traces; remove the estimated noise from the acquired acoustic traces, wherein the removing generates mitigated traces; and reconstruct DAS acoustic traces based, at least in part, on replacing the acquired acoustic traces with the mitigated traces for each trace in a group of traces corresponding to zigzag noise.

Embodiment 13: The machine-readable media of embodiment 12, wherein program code comprising instructions to identify a zigzag noise periodicity based on a summation of the autocorrelation values comprises program code to: for each value of lag, sum the autocorrelation values over all traces of the group of traces for the value of lag sum the autocorrelation values along a diagonal from zero lag and the channel maximum of the group of traces to the value of lag and the channel minimum of the group of traces; sum the autocorrelation values along a diagonal from zero lag and the channel minimum of the group of traces to the value of lag and the channel minimum of the group of traces; output a crosswise lag summation value based, at least in part, on totaling the three summation legs; and identify a zigzag noise periodicity based, at least in part, on the lag corresponding to the maximum value of the crosswise lag summation.

Embodiment 14: The machine-readable media of embodiment 12 or 13, wherein program code comprising instructions to generate an estimated noise further comprises program code to: time shift the estimated noise by multiple time adjustments to generate a plurality of time shifted estimated noise; calculate a cross correlation of each time shifted estimated noise and the acquired acoustic traces; determine a maximum of the calculated cross correlations; and replace the estimated noise with the one of the plurality of time shifted estimated noise corresponding to the maximum calculated cross correlation.

Embodiment 15: The machine-readable media of any one of embodiments 12 to 14, wherein program code comprising instructions to generate an estimated noise further comprises program code to: calculate a scalar ratio based, at least in part, on a dot product of the estimated noise with the acquired acoustic traces divided by a dot product of the estimated noise with itself; and replace the estimated noise with the estimated noise multiplied by the scalar ratio.

Embodiment 16: The machine-readable media of any one of embodiments 12 to 15, wherein program code comprising instructions to generate an estimated noise comprises program code to: generate a time-limited comb operator based, at least in part, on the identified zigzag noise periodicity for the group of traces; identify times for which each acoustic trace corresponds to zigzag noise based, at least in part, on a value of the convolution of the time-limited comb operator and the acoustic trace; and generate an estimated noise based, at least in part, on the values of each acoustic trace at the identified times.

Embodiment 17: The machine-readable media of embodiment 12, wherein program code comprising instructions to remove the estimated noise comprises program code to: time-reverse the acquired acoustic traces; remove the estimated noise based, at least in part, on predictive deconvolution, wherein the removing generates time-reversed mitigated traces; restore the time-reversed mitigated traces to a time forward direction; and remove acausal noise before a first seismic event based, at least in part, on the identified zigzag noise periodicity, wherein the estimate noise is generated based, at least in part, on predictive deconvolution.

Embodiment 18: An apparatus comprising: a processor; and a machine-readable medium having program code executable by the processor to cause the apparatus to, generate autocorrelation values for distributed acoustic sensing (DAS) acoustic traces acquired at depths over time in a wellbore; identify one or more groups of traces that correspond to zigzag noise based, at least in part, on the autocorrelation values; for each group of traces that corresponds to zigzag noise, for each value of lag, sum the autocorrelation values over all traces of the group of traces for the value of lag sum the autocorrelation values along a diagonal from zero lag and the channel maximum of the group of traces to the value of lag and the channel minimum of the group of traces; sum the autocorrelation values along a diagonal from zero lag and the channel minimum of the group of traces to the value of lag and the channel minimum of the group of traces; output a crosswise lag summation value based, at least in part, on totaling the three summation legs; and identify a zigzag noise periodicity based, at least in part, on the lag corresponding to the maximum value of the crosswise lag summation; generate an estimated noise based, at least in part, on the identified zigzag noise periodicity for the group of traces; remove the estimated noise from the acquired acoustic traces, wherein the removing generates mitigated traces; and reconstruct DAS acoustic traces based, at least in part, on replacing the acquired acoustic traces with the mitigated traces for each trace in a group of traces corresponding to zigzag noise.

Embodiment 19: The apparatus of embodiment 18, wherein the machine-readable medium program code executable by the processor to generate an estimated noise from the acquired acoustic traces comprises program executable by the processor to cause the apparatus to: generate a time-limited comb operator based, at least in part, on the identified zigzag noise periodicity for the group of traces; identify times for which each acoustic trace corresponds to zigzag noise based, at least in part, on a value of the convolution of the time-limited comb operator and the acoustic trace; and generate an estimated noise based, at least in part, on the values of each acoustic trace at the identified times.

Embodiment 20: The apparatus of embodiment 18 or 19, wherein the machine-readable medium program code executable by the processor to remove the estimated noise comprises program executable by the processor to cause the apparatus to: time-reverse the acquired acoustic traces; remove the estimated noise based, at least in part, on predictive deconvolution, wherein the removing generates time-reversed mitigated traces; time-forward the time-reversed mitigated traces; and remove acausal noise before a first seismic event based, at least in part, on the identified zigzag noise periodicity, wherein the estimate noise is generated based, at least in part, on predictive deconvolution.

What is claimed is:

1. A method comprising:
   acquiring, via an optical fiber in a wellbore, distributed acoustic sensing (DAS) data traces at different depths over time, wherein the DAS data traces are based, at least in part, on seismic signals traveling through a formation;
   generating autocorrelation values for (DAS) data traces;
   identifying one or more groups of acoustic traces that correspond to zigzag noise based, at least in part, on the autocorrelation values;

for each group of acoustic traces that corresponds to zigzag noise,
performing, by a zigzag noise mitigator, a summation of the autocorrelation values as a function of lag;
identifying, by the zigzag noise mitigator, a zigzag noise periodicity based, at least in part, on the summation of the autocorrelation values;
generating, by the zigzag noise mitigator, an estimated noise signal based, at least in part, on the identified zigzag noise periodicity for the group of traces;
removing, by the zigzag noise mitigator, the estimated noise signal from the group of acoustic traces to generate noise mitigated traces;
reconstructing the DAS data traces based, at least in part, on replacing the one or more groups of acoustic traces with the noise mitigated traces for the one or more groups of traces corresponding to zigzag noise; and
generating an image of the formation with the DAS data traces, the image of the formation comprising the noise mitigated traces for the one or more groups of traces corresponding to the zigzag noise.

2. The method of claim 1, wherein performing a summation of the autocorrelation as a function of lag comprises:
for each value of lag,
summing the autocorrelation values over all traces of the group of traces for the value of lag to generate a first summation leg;
summing the autocorrelation values along a diagonal from zero lag and a channel maximum of the group of traces to the value of lag and a channel minimum of the group of traces to generate a second summation leg;
summing the autocorrelation values along a diagonal from zero lag and the channel minimum of the group of traces to the value of lag and the channel minimum of the group of traces to generate a third summation leg; and
outputting a crosswise lag summation value based, at least in part, on totaling the three summation legs.

3. The method of claim 2, wherein identifying the zigzag noise periodicity comprises identifying a lag corresponding to a maximum value of the crosswise lag summation.

4. The method of claim 1, wherein generating the estimated noise signal further comprises adjusting the estimated noise signal based, at least in part, on the group of acoustic traces.

5. The method of claim 4, wherein adjusting the estimated noise signal comprises:
time shifting the estimated noise signal by multiple time adjustments to generate a plurality of time shifted estimated noise;
calculating a cross correlation of each time shifted estimated noise and the group of acoustic traces;
determining a maximum of the calculated cross correlations; and
replacing the estimated noise signal with the one of the plurality of time shifted estimated noise corresponding to the maximum calculated cross correlation.

6. The method of claim 5, wherein adjusting the estimated noise signal comprises:
Calculating a scalar ratio based, at least in part, on a dot product of the estimated noise signal with the group of acoustic traces divided by a dot product of the estimated noise signal with itself; and
replacing the estimated noise signal with the estimated noise signal multiplied by the scalar ratio.

7. The method of claim 1 wherein generating the estimated noise signal comprises:

generating a time-limited comb operator based, at least in part, on the identified zigzag noise periodicity for the group of acoustic traces;
identifying times for which each acoustic trace corresponds to the zigzag noise based, at least in part, on a value of the convolution of the time-limited comb operator and the acoustic trace; and
generating an estimated noise signal based, at least in part, on the values of each acoustic trace at the identified times.

8. The method of claim 7 further comprising:
filtering the estimated noise signal based, at least in part, on a time based filter.

9. The method of claim 7 further comprising:
filtering the estimated noise signal based, at least in part, on a filter across acoustic traces.

10. The method of claim 1, wherein generating the estimated noise signal comprises generating the estimated noise signal based, at least in part, on predictive deconvolution.

11. The method of claim 10, further comprising:
time-reversing each of the one or more groups of acoustic traces,
wherein removing the estimated noise signal from each group of acoustic traces comprises,
removing the estimated noise signal from the time-reversed group of acoustic traces to generate time-reversed mitigated traces;
restoring the time-reversed mitigated traces to a time-forward domain to generates mitigated traces; and
removing from the group of mitigated traces acausal noise before a first seismic event based, at least in part, on the identified zigzag noise periodicity of the group of acoustic traces to generates noise mitigated traces.

12. A non-transitory machine-readable medium having stored therein program code for mitigating zigzag noise for distributed acoustic sensing (DAS) data traces, the program code comprising instructions to:
acquire, via an optical fiber in a wellbore, DAS data traces at different depths over time, wherein the DAS data traces are based, at least in part, on seismic signals traveling through a formation;
generate autocorrelation values for (DAS) data traces;
identify one or more groups of acoustic traces that correspond to zigzag noise based, at least in part, on the autocorrelation values;
for each group of acoustic traces that corresponds to zigzag noise,
identify, by a zigzag noise mitigator, a zigzag noise periodicity based, at least in part, on a summation of the autocorrelation values;
generate, by a zigzag noise mitigator, an estimated noise based, at least in part, on the identified zigzag noise periodicity for the group of traces;
remove, by a zigzag noise mitigator, the estimated noise from the group of acoustic traces to generate mitigated traces;
reconstruct DAS data traces based, at least in part, on replacing the one or more group of acoustic traces with the mitigated traces for the one or more groups of traces corresponding to zigzag noise; and
generate an image of the formation with the DAS data traces, the image of the formation comprising the mitigated traces for the one or more groups of traces corresponding to the zigzag noise.

13. The machine-readable media of claim 12, wherein program code comprising instructions to identify the zigzag noise periodicity based on the summation of the autocorrelation values comprises program code to:
for each value of lag,
sum the autocorrelation values over all traces of the group of traces for the value of lag to generate a first summation leg;
sum the autocorrelation values along a diagonal from zero lag and a channel maximum of the group of traces to the value of lag and a channel minimum of the group of traces to generate a second summation leg;
sum the autocorrelation values along a diagonal from zero lag and the channel minimum of the group of traces to the value of lag and the channel minimum of the group of traces to generate a third summation leg;
output a crosswise lag summation value based, at least in part, on totaling the three summation legs; and
identify the zigzag noise periodicity based, at least in part, on a lag corresponding to a maximum value of the crosswise lag summation.

14. The machine-readable media of claim 12, wherein program code comprising instructions to generate the estimated noise further comprises program code to:
time shift the estimated noise by multiple time adjustments to generate a plurality of time shifted estimated noise;
calculate a cross correlation of each time shifted estimated noise and the group of acoustic traces;
determine a maximum of the calculated cross correlations; and
replace the estimated noise with the one of the plurality of time shifted estimated noise corresponding to the maximum calculated cross correlation.

15. The machine-readable media of claim 12, wherein program code comprising instructions to generate the estimated noise further comprises program code to:
calculate a scalar ratio based, at least in part, on a dot product of the estimated noise with the group of acoustic traces divided by a dot product of the estimated noise with itself; and
replace the estimated noise with the estimated noise multiplied by the scalar ratio.

16. The machine-readable media of claim 12, wherein program code comprising instructions to generate the estimated noise comprises program code to:
generate a time-limited comb operator based, at least in part, on the identified zigzag noise periodicity for the group of traces;
identify times for which each acoustic trace corresponds to zigzag noise based, at least in part, on a value of the convolution of the time-limited comb operator and the acoustic trace; and
generate an estimated noise based, at least in part, on the values of each acoustic trace at the identified times.

17. The machine-readable media of claim 12, wherein program code comprising instructions to remove the estimated noise comprises program code to:
time-reverse the group of acoustic traces;
remove the estimated noise based, at least in part, on predictive deconvolution to generates time-reversed mitigated traces;
restore the time-reversed mitigated traces to a time forward direction; and
remove acausal noise before a first seismic event based, at least in part, on the identified zigzag noise periodicity,
wherein the estimated noise is generated based, at least in part, on predictive deconvolution.

18. An apparatus comprising:
an optical fiber within a wellbore;
a processor; and
a machine-readable medium having program code executable by the processor to cause the apparatus to,
acquire, via the optical fiber, distributed acoustic sensing (DAS) data traces at different depths over time, wherein the DAS data traces are based, at least in part, on seismic signals traveling through a formation;
generate autocorrelation values for (DAS) data traces acquired at depths over time in a wellbore;
identify one or more groups of traces that correspond to zigzag noise based, at least in part, on the autocorrelation values;
for each group of traces that corresponds to zigzag noise, for each value of lag,
sum the autocorrelation values over all traces of the group of traces for the value of lag to generate a first summation leg;
sum the autocorrelation values along a diagonal from zero lag and a channel maximum of the group of traces to the value of lag and a channel minimum of the group of traces to generate a second summation leg;
sum the autocorrelation values along a diagonal from zero lag and the channel minimum of the group of traces to the value of lag and the channel minimum of the group of traces to generate a third summation leg;
output a crosswise lag summation value based, at least in part, on totaling the three summation legs; and
identify, by a zigzag noise mitigator, a zigzag noise periodicity based, at least in part, on a lag corresponding to a maximum value of the crosswise lag summation;
generate, by a zigzag noise mitigator, an estimated noise based, at least in part, on the identified zigzag noise periodicity for the group of traces;
remove, by a zigzag noise mitigator, the estimated noise from the group of acoustic traces to generate mitigated traces;
reconstruct DAS data traces based, at least in part, on replacing the group of acoustic traces with the mitigated traces for the one or more groups of traces corresponding to zigzag noise; and
generate an image of the formation with the DAS data traces, the image of the formation comprising the mitigated traces for the one or more groups of traces corresponding to the zigzag noise.

19. The apparatus of claim 18, wherein the machine-readable medium program code executable by the processor to generate the estimated noise from the group of acoustic traces comprises program executable by the processor to cause the apparatus to:
generate a time-limited comb operator based, at least in part, on the identified zigzag noise periodicity for the group of traces;
identify times for which each acoustic trace corresponds to zigzag noise based, at least in part, on a value of the convolution of the time-limited comb operator and the acoustic trace; and generate the estimated noise based, at least in part, on the values of each acoustic trace at the identified times.

20. The apparatus of claim 18, wherein the machine-readable medium program code executable by the processor to remove the estimated noise comprises program executable by the processor to cause the apparatus to:
time-reverse the group of acoustic traces;
remove the estimated noise based, at least in part, on predictive deconvolution, to generate time-reversed mitigated traces;
time-forward the time-reversed mitigated traces; and
remove acausal noise before a first seismic event based, at least in part, on the identified zigzag noise periodicity, wherein the estimated noise is generated based, at least in part, on predictive deconvolution.

\* \* \* \* \*